(12) United States Patent
Kato

(10) Patent No.: US 11,381,273 B2
(45) Date of Patent: Jul. 5, 2022

(54) WIRELESS COMMUNICATION DEVICE

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/116,457

(22) Filed: Dec. 9, 2020

(65) Prior Publication Data

US 2021/0119663 A1    Apr. 22, 2021

Related U.S. Application Data

(63) Continuation of application No. PCT/JP2019/013716, filed on Mar. 28, 2019.

(30) Foreign Application Priority Data

Jun. 13, 2018    (JP) .............................. JP2018-112950

(51) Int. Cl.
    *H04B 1/40*    (2015.01)
(52) U.S. Cl.
    CPC ...................... *H04B 1/40* (2013.01)
(58) Field of Classification Search
    CPC .......... H04B 1/40; H01Q 1/2225; H01Q 9/26; H01Q 9/285; G06K 19/07786
    USPC .......................................................... 455/73
    See application file for complete search history.

(56) References Cited

U.S. PATENT DOCUMENTS

| 9,172,146 | B2 | 10/2015 | Ishikawa |
| 2007/0132593 | A1 | 6/2007 | Yamazaki |
| 2008/0143620 | A1* | 6/2008 | Khatri ............... H01Q 5/371 343/726 |
| 2009/0082833 | A1 | 3/2009 | Wosmek et al. |
| 2010/0097280 | A1* | 4/2010 | Zirbes ................ H01Q 7/00 343/726 |
| 2011/0137379 | A1 | 6/2011 | Wosmek et al. |

(Continued)

FOREIGN PATENT DOCUMENTS

| JP | 2006338563 A | 12/2006 |
| JP | 2007164528 A | 6/2007 |
| JP | 2014093690 A | 5/2014 |

(Continued)

OTHER PUBLICATIONS

International Search Report issued for PCT/JP2019/013716, dated Jun. 11, 2019.

(Continued)

*Primary Examiner* — Ankur Jain
(74) *Attorney, Agent, or Firm* — ArentFox Schiff LLP

(57) ABSTRACT

A wireless communication device is provided for transmitting and receiving a high frequency signal having a first frequency for communication. The wireless communication device includes a base material, an antenna pattern formed on the base material, and a loop-shaped conductor pattern. The loop-shaped conductor pattern is formed on the same surface of the base material on which the antenna pattern is formed and arranged on both sides of the antenna pattern along an extending direction of the antenna pattern. A physical perimeter of the conductor pattern is shorter than the physical total length of the antenna pattern.

20 Claims, 28 Drawing Sheets

(56) References Cited

U.S. PATENT DOCUMENTS

2014/0125534 A1 5/2014 Ishikawa
2018/0062271 A1 3/2018 Toyao

FOREIGN PATENT DOCUMENTS

WO 2015045614 A1 4/2015
WO 2016148274 A1 9/2016

OTHER PUBLICATIONS

Written Opinion of the International Searching Authority issued for PCT/JP2019/013716, dated Jun. 11, 2019.

* cited by examiner

WIRELESS COMMUNICATION DEVICE

CROSS REFERENCE TO RELATED APPLICATIONS

The present application is a continuation of PCT/JP2019/013716 filed Mar. 28, 2019, which claims priority to Japanese Patent Application No. 2018-112950, filed Jun. 13, 2018, the entire contents of each of which are incorporated herein by reference.

TECHNICAL FIELD

The present invention relates to a wireless communication device including an antenna and, more particularly, to a wireless communication device using RFID (Radio Frequency IDentification) technology of performing non-contact data communication through an induction electromagnetic field or radio waves.

BACKGROUND

Accounting of commercial products can be automated by attaching RFID tags serving as wireless communication devices to articles that are the commercial products. Using this automated settlement system, when a basket containing an article with an RFID tag is placed on a checkout counter, information from the RFID tag is read and a product price is displayed.

A wide variety of commercial products is handled at stores such as supermarkets, and some articles of food handled as the commercial products are heated immediately after the purchase of the commercial products and are immediately eaten and drunk by the purchaser on the spot. Examples of the commercial products heated and eaten/drunk in this way include articles of food such as boxed meals and cup noodles. These commercial products are assumed to be heated at a store by using an electromagnetic wave heating device, such as a microwave oven.

In general, the RFID tag has a metal material such as an antenna pattern that is a metal film body formed on a paper material or a resin material together with an RFIC (Radio-Frequency Integrated Circuit) chip. When a commercial product with such an RFID tag attached is heated by a microwave oven, for example, when boxed meals with an RFID tag is heated, electromagnetic waves from the microwave oven are absorbed by the RFID tag as well as the boxed meals. As a result, an electric field is concentrated in a metal material portion of the RFID tag and causes a discharge, or an overcurrent flows in the metal material portion. Consequently, the RFID tag may ignite due to heating and sublimation of metal itself or ignition of the paper material or resin material constituting the tag.

A configuration of a flame-retardant tag is proposed in Japanese Laid-Open Patent Publication No. 2006-338563 (hereinafter "Patent Document 1") for the purpose of reducing ignition in the RFID tag as described above.

In the flame-retardant tag disclosed in Patent Document 1, a flame-retardant material is used as a base material on which an RFIC chip and an antenna pattern are mounted. Since the flame-retardant material is used as the base material, even if the base material ignites, fire is extinguished in several seconds to a few tens of seconds. However, the discharge may successively occur in a metal material portion formed on the base material, and this effect may cause the base material to ignite again and a commercial product may catch fire.

SUMMARY OF THE INVENTION

Accordingly, it is an object of the present invention is to provide a wireless communication device constructed to prevent ignition of a commercial product to which a wireless communication device is attached, even when an electromagnetic wave in a frequency band higher than a predetermined communication frequency is applied to the commercial product to which the wireless communication device is attached.

Thus, in an exemplary aspect of the present invention, a wireless communication device is provided for transmitting and receiving a high frequency signal having a first frequency for communication. The wireless communication device includes a base material; an antenna pattern formed on the base material; and a loop-shaped conductor pattern formed on the same surface of the base material on which the antenna pattern is formed, and arranged on both sides of the antenna pattern along an extending direction of the antenna pattern. Moreover, a physical perimeter of the conductor pattern is shorter than the physical total length of the antenna pattern.

According to the exemplary aspects of the present invention, a wireless communication device is provided that is configured to prevent the risk of ignition of a commercial product even when an electromagnetic wave in a frequency band higher than a predetermined communication frequency is applied to the commercial product to which the wireless communication device is attached.

DETAILED DESCRIPTION

Figure 1:
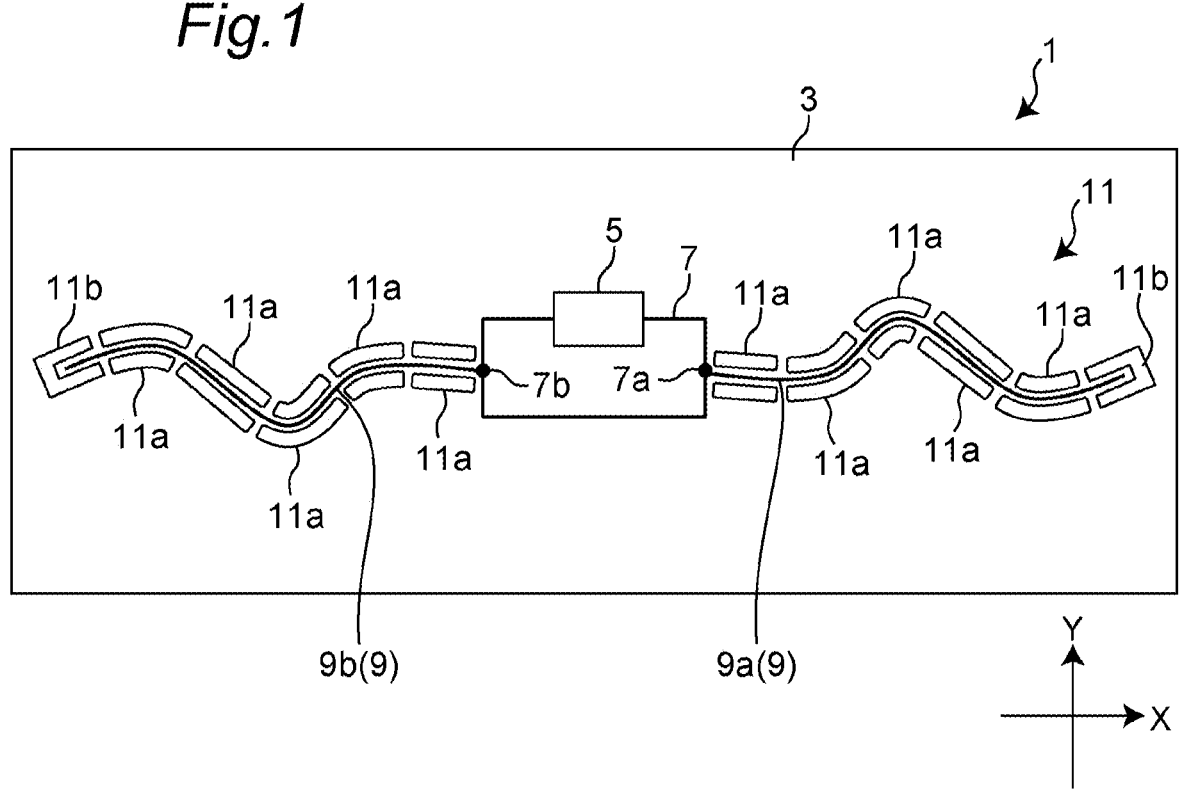
FIG. 1 is a plan view showing a wireless communication device (RFID tag) of a first exemplary embodiment.

According to an exemplary aspect of the present invention, a wireless communication device is provided for transmitting and receiving a high frequency signal having a first frequency for communication. In this aspect, the wireless communication device includes a base material; an antenna pattern formed on the base material; and a loop-shaped conductor pattern formed on the same surface of the base material on which the antenna pattern is formed, and arranged on both sides of the antenna pattern along an extending direction of the antenna pattern. Moreover, a physical perimeter of the conductor pattern is shorter than the physical total length of the antenna pattern.

In the wireless communication device of this exemplary aspect, the loop-shaped conductor pattern having a physical perimeter shorter than the physical total length of the antenna pattern is arranged. The entire length of the antenna pattern is designed to receive the radio wave of the first frequency for communication. The conductor pattern having a perimeter shorter than the total length of the antenna pattern does not have the antenna length for receiving the radio wave of the first frequency for communication and therefore does not hinder the transmission and reception of the high frequency signal for communication by the antenna pattern.

When an electromagnetic wave in a frequency band higher than the first frequency for communication is applied to the wireless communication device, the loop-shaped conductor pattern is constructed as a magnetic field antenna to generate a magnetic field. Moreover, the magnetic field antenna is formed at a position close to the antenna pattern receiving an electromagnetic wave in a frequency band higher than the first frequency. This deteriorates the antenna radiation efficiency of the antenna pattern in the frequency band higher than the first frequency, so that the energy received by the antenna pattern can be reduced. As a result, the risk of ignition is prevented in a commercial product to which the wireless communication device is attached.

In an exemplary aspect, the antenna pattern can have a linear shape, a curved shape, or a combination of a linear shape and a curved shape.

However, it is noted that the loop shape of the conductor pattern is not limited to a circular shape. The conductor pattern can have any shape such as an ellipse, a protruding shape, a recess shape, or a rectangle as long as the starting point and the ending point of the conductor pattern are connected and continuous.

In an exemplary aspect, the electrical perimeter of the conductor pattern may be shorter than one wavelength of the high frequency signal of the first frequency.

In an exemplary aspect, the electrical perimeter of the conductor pattern can be shorter than a half wavelength of the high frequency signal of the first frequency.

In an exemplary aspect, the electrical perimeter of the conductor pattern cannot be an integral multiple of a wavelength of a high frequency wave of a second frequency higher than the first frequency.

In an exemplary aspect, the electrical perimeter of the conductor pattern can be longer than a half wavelength of the high frequency wave of the second frequency.

Moreover, the antenna pattern can extend in a meander shape, and at least a portion of the conductor pattern may be arranged on the outer side in a meander amplitude direction relative to a folded portion of the meander-shaped antenna pattern.

In an exemplary aspect, the conductor pattern can be one of conductor patterns having respective different perimeters arranged along a longitudinal direction of an outer edge part of the base material.

Moreover, in an exemplary aspect, the conductor pattern can have a protruding part protruding inward from the outside in the meander amplitude direction, and the protruding portion of the conductor pattern may be arranged between the adjacent folded portions of the antenna pattern.

Moreover, a loop-shaped shield pattern can be arranged along a width direction of the outer edge part of the base material.

In an exemplary aspect, the first frequency can be a frequency band in a UHF band.

In an exemplary aspect, the first frequency can be a frequency band in an HF band.

In an exemplary aspect, the second frequency can be a frequency used for electromagnetic wave heating.

Specific exemplary embodiments of a wireless communication device according to the present invention will now be described with reference to the accompanying drawings. It is noted that in the drawings, members having substantially the same function and configuration are denoted by the same reference numeral and may not be described in the description. To facilitate understanding, the drawings are schematic representations mainly showing respective constituent elements.

All the exemplary embodiments described below show specific examples of the present invention, but it also should be appreciated that the present invention is not limited to these configurations. Numerical values, shapes, configurations, steps, order of steps, etc. specifically described in the following embodiments are merely examples and do not limit the present invention. In all the embodiments, the same applies to configurations in respective modifications, and the configurations described in the modifications may be combined with each other.

For a commercial product to which the wireless communication device according to the exemplary embodiments is attached, it is noted that all the commercial products handled at retail stores, such as convenience stores and supermarkets can be provided. Although an electromagnetic wave heating device described in the following embodiments will be described by using a microwave oven performing dielectric heating as an example, any heating device having a function of performing dielectric heating is available for the electromagnetic wave heating device in the present invention. The exemplary embodiments of the present invention relate to a commercial product sales system in which wireless communication devices having the same configuration are attached to all commercial products.

When a relative permittivity εr of an antenna base material is >1, the electrical length of the antenna pattern and the conductor pattern becomes longer than the physical length. It is noted that for this description, the physical length refers to a line length formed on the antenna base material. The electrical length is a length when shortening or extension of wavelength due to relative permittivity or a parasitic reactance component is taken into consideration.

First Exemplary Embodiment

A schematic configuration of an RFID tag 1 serving as the wireless communication device according to the present invention will be described.

FIG. 1 is a plan view showing the RFID tag 1 serving as the wireless communication device of the first exemplary embodiment. In the figures, an X-Y-Z coordinate system is provided for facilitating understanding of the exemplary embodiments. An X-axis direction indicates a longitudinal direction of the RFID tag 1, a Y-axis direction indicates a width direction, and a Z-axis direction indicates a thickness direction. The X, Y, and Z directions are orthogonal to each other.

The RFID tag 1 is configured to perform wireless communication (e.g., transmission/reception) through a high frequency signal having a communication frequency (e.g., carrier frequency) and has a configuration capable of wireless communication in a wide frequency band. The RFID tag 1 includes an antenna base material 3, an RFIC chip 5, a loop pattern 7 electrically connected to the RFIC chip 5, an antenna pattern 9 directly connected to the loop pattern 7, and multiple loop-shaped conductor patterns 11 arranged on the outside of the antenna pattern 9. It is noted that the antenna base material 3 is not limited to a rectangular shape shown in FIG. 1 and may have an elliptical shape or a circular shape, for example.

The antenna pattern 9 has a first antenna pattern 9a extending outward in the longitudinal direction from a first contact point 7a of the loop pattern 7, and a second antenna pattern 9b extending from the second contact 7b of the loop pattern 7 in a direction opposite to the first antenna pattern 9a. The antenna pattern 9 is configured as a dipole antenna by the first and second antenna patterns 9a, 9b. The first and second antenna patterns 9a, 9b are arranged in a point-symmetrical positional relationship with respect to a substantial center of the antenna base material 3.

The total length of the antenna pattern 9, i.e., the electrical total length obtained by adding the lengths of the first and second antenna patterns 9a, 9b, is at least a half wavelength of a high frequency signal of a first frequency for communication. The electrical and physical total lengths of the antenna pattern 9 are constructed to receive the high frequency signal of the first frequency for communication.

Conductor patterns 11 are arranged along the extending direction of the antenna pattern 9. The conductor patterns 11 include loop-shaped first conductor patterns 11a arranged on both sides of the antenna pattern along the extending direction of the antenna pattern 9 and loop-shaped second conductor patterns 11b arranged to surround leading end parts of the antenna pattern 9.

A perimeter (i.e., a physical length of the perimeter) of each of the first and second conductor patterns 11a, 11b is shorter than the physical total length of the antenna pattern 9. As a result, the conductor patterns 11 are inferior in function as an electric field antenna to the antenna pattern 9 in terms of the first frequency for communication. Therefore, this configuration does not hinder the characteristics of the antenna pattern 9 serving as an electric field antenna for the first frequency.

Figure 2:
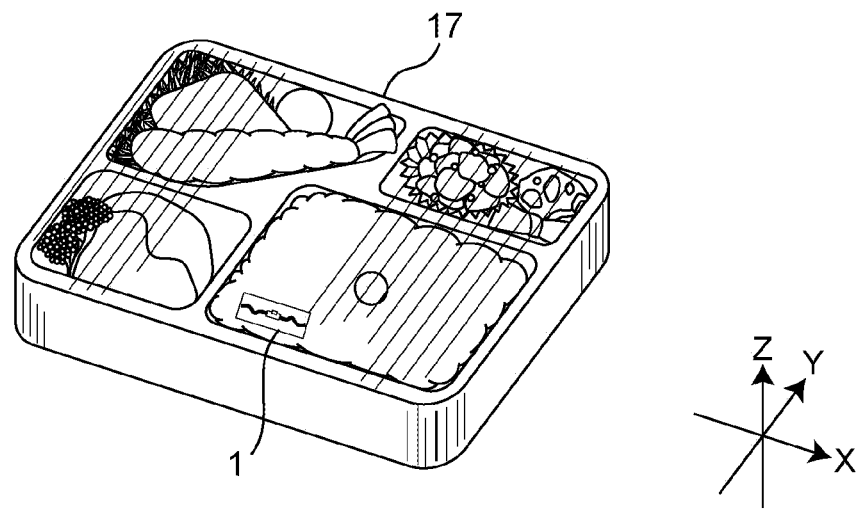
FIG. 2 is a view showing an example in which the wireless communication device of the first exemplary embodiment is attached to an article.

FIG. 2 is a view showing an example in which the wireless communication device of the first embodiment is attached to an article. The RFID tag 1 is affixed to the article that is boxed meals, for example. The RFID tag 1 may be attached to an article 17 in any direction.

The RFID tag 1 of the first embodiment is a wireless communication device for transmitting and receiving a high frequency signal having the first frequency for communication. The RFID tag 1 includes the antenna base material 3, the antenna pattern 9 formed on the antenna base material 3, and the loop-shaped conductor patterns 11 formed on the same surface of the antenna base material 3 on which the antenna pattern 9 is formed and arranged on both sides of the antenna pattern 9 along the extending direction of the antenna pattern 9. The antenna pattern 9 is arranged between the conductor patterns 11. The physical perimeter of the conductor patterns 11 is shorter than the physical total length of the antenna pattern 9.

When radio waves having a frequency higher than the first frequency is applied to the RFID tag 1, an induced current flows through the antenna pattern 9. Since the conductor patterns 11 are arranged on both sides of the antenna pattern 9 along the extending direction of the antenna pattern 9, the conductor patterns 11 are coupled through a magnetic field to the antenna pattern 9. Therefore, due to the magnetic field generated by the induced current flowing through the antenna pattern 9, an induced current also flows through the conductor patterns 11. A magnetic field is further generated by the current flowing through the conductor patterns 11, and the magnetic field generated from the antenna pattern 9 and the magnetic field generated from the conductor patterns 11 cancel each other.

In this way, the electric field energy applied to the antenna pattern 9 is lost, so that the electric field energy applied to the antenna pattern 9 can be prevented from accumulating. Since the physical perimeter of the conductor pattern 11 is shorter than the total length of the antenna pattern 9, the interference of transmission and reception of the high frequency signal of the first frequency is less hindered by the conductor patterns 11.

Second Exemplary Embodiment

Figure 3:
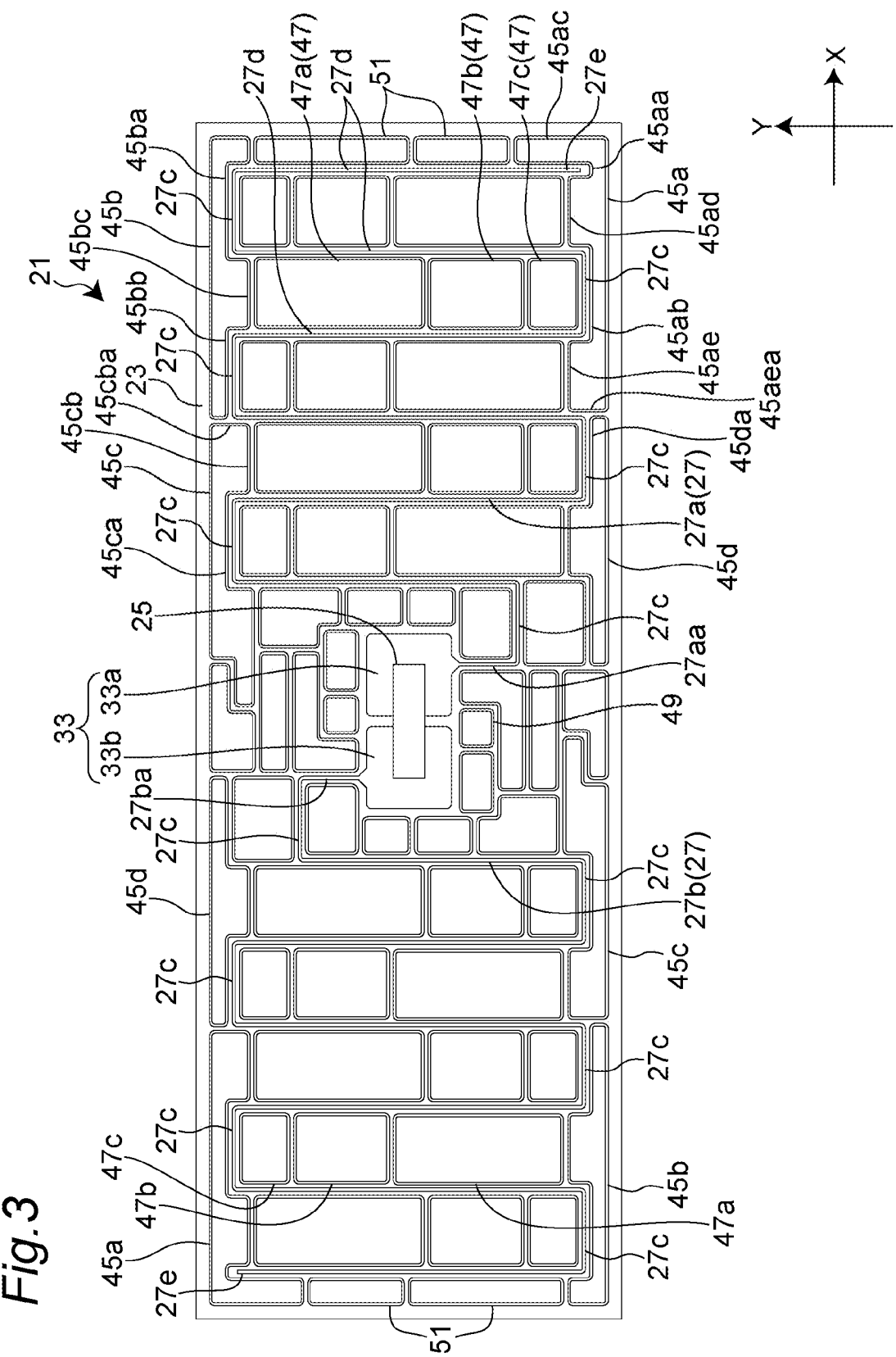
FIG. 3 is a plan view showing a wireless communication device (RFID tag) of a second exemplary embodiment.
Figure 4:
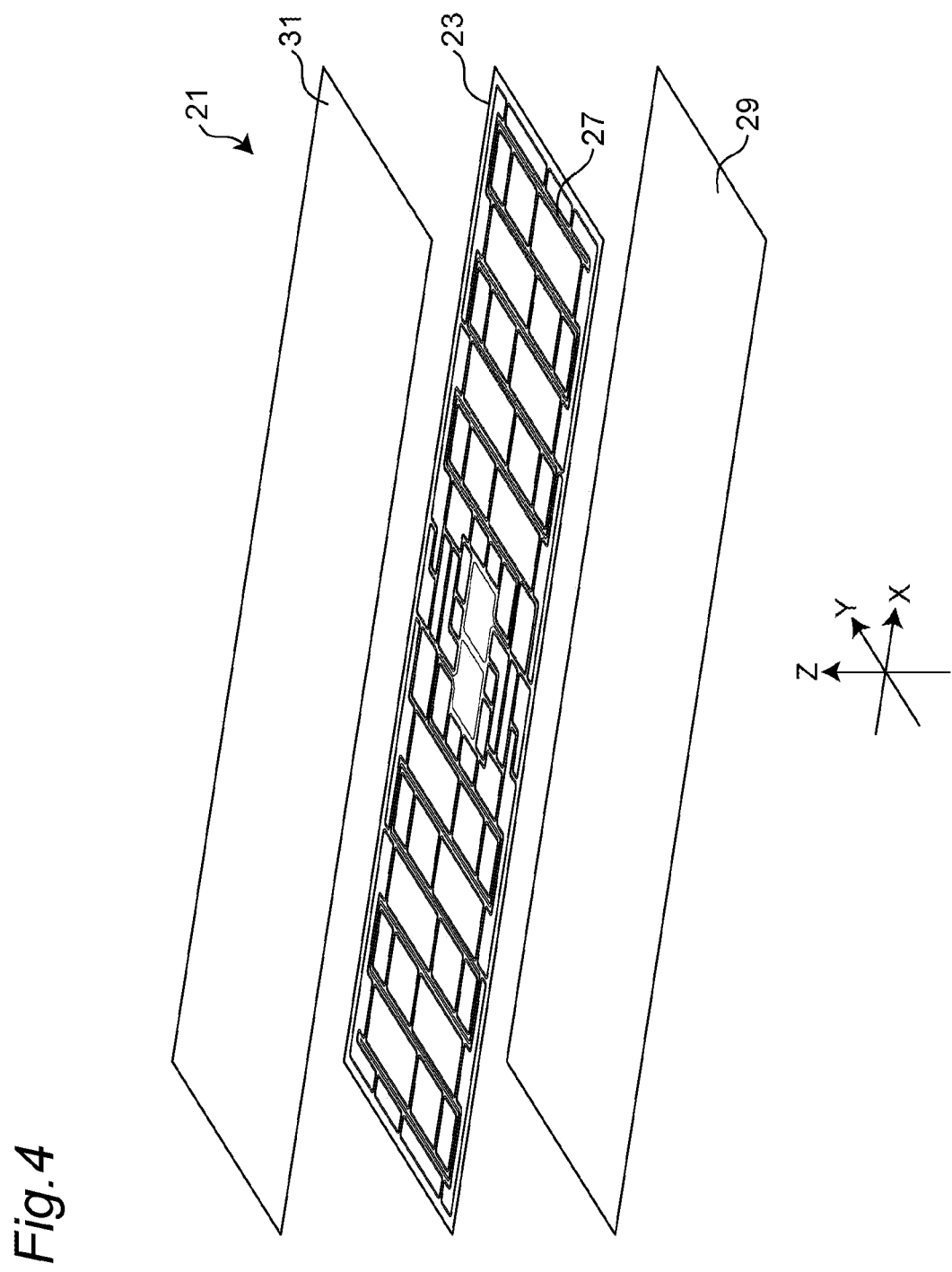
FIG. 4 is an exploded perspective view showing a configuration of the wireless communication device of the second exemplary embodiment.

FIG. 3 is a plan view showing an RFID tag 21 that is a wireless communication device of a second exemplary embodiment. FIG. 4 is an exploded perspective view showing a configuration of the RFID tag 21. The RFID tag 21 is configured to perform wireless communication through a high frequency signal having a frequency for communication in the UHF band, for example. In this case, the UHF band is a frequency band from 860 MHz to 960 MHz. The UHF band communication frequency is an example of a "first frequency for communication" in the present disclosure.

As shown, the RFID tag 21 includes an antenna base material 23 that is a dielectric, an RFIC package 25 described later, an antenna pattern 27, and conductor patterns 45. For the antenna base material 23, for example, a flexible film material such as a PET (polyethylene terephthalate) film is used. The antenna base material 23 has a substantially rectangular shape or may have an elliptical shape or a circular shape in alternative aspects.

The antenna pattern 27 can be made up of a film of a conductive material such as aluminum foil or copper foil is formed on a surface of the antenna base material 23. The antenna pattern 27 may be made of a material inferior in conductivity to metal such as a carbon-based material other than the metal material.

The antenna pattern 27 is provided with two land patterns 33 (33a, 33b) for coming into contact with and electrically connecting to the RFIC package 25. As a result, an RFIC chip 37 of the RFIC package 25 and the antenna pattern 27 are electrically connected. The electric connection can be configured as being connected or coupled to each other operably such that high-frequency signals are transmitted and is not limited to being connected in terms of a direct current.

As shown in FIG. 4, the RFID tag 21 includes a base material 29 affixed to a lower surface of the antenna base material 23 via an adhesive such as a double-sided tape, and a protective sheet 31 protecting the antenna pattern 27.

The base material 29 is more flame-retardant than the antenna base material 23 and is flame-retardant at about 200° C., for example. The base material 29 is a PET-based film, for example. The thickness of the antenna base material 23 is 38 μm, for example. The thickness of the base material 29 is about 25 to 50 μm, for example.

The protective sheet 31 is affixed to an upper surface of the antenna base material 23 through an adhesive such as a double-sided tape. The protective sheet 31 is a PET-based film label, for example.

As described above, the antenna pattern 27 formed on the antenna base material 23 is sandwiched by the antenna base material 23, the base material 29, and the protective sheet 31 and is therefore affected by the respective relative permittivities. In the second embodiment, since the antenna base material 23, the base material 29, and the protective sheet 31 are PET-based films each having a relative permittivity ε of about 3, the antenna pattern 27 sandwiched therebetween also has the relative permittivity ε of about 3.

As shown in FIG. 3, the antenna pattern 27 is a field emission type antenna pattern and has a first antenna pattern 27a and a second antenna pattern 27b having a meander shape meandering through multiple folded portions 27c from the land patterns 33 on which the RFIC package 25 is mounted. The antenna pattern 27 forms a dipole type electric field antenna by the first antenna pattern 27a and the second antenna pattern 27b. A difference between the first antenna pattern 27a and the second antenna pattern 27b is that the patterns are arranged in a point-symmetrical positional relationship with respect to a center portion of a substrate, and the other configurations are the same.

The first antenna pattern 27a has a substantially linear shape pattern. Moreover, the first antenna pattern 27a extends in a meander shape from the first land pattern 33a and extends toward one end part of the antenna base material 23 in the longitudinal direction (e.g., the +X direction). A leading end part 27e of the first antenna pattern 27a in the extending direction is located at one end part of the antenna base material 23 in the longitudinal direction.

The second antenna pattern 27b has a substantially linear shape pattern. Moreover, the second antenna pattern 27b extends in a meander shape from the second land pattern 33b and extends toward the other end part of the antenna base material 23 in the longitudinal direction (e.g., the −X direction). A leading end part 27e of the second antenna pattern 27b in the extending direction is located at the other end part of the antenna base material 23 in the longitudinal direction.

According to an exemplary aspect, the first and second antenna patterns 27a, 27b have a line width of 125 μm, for example. A line width of inter-line patterns 47 is thinner than the first and second antenna patterns 27a, 27b and is 100 μm, for example.

Figure 5:
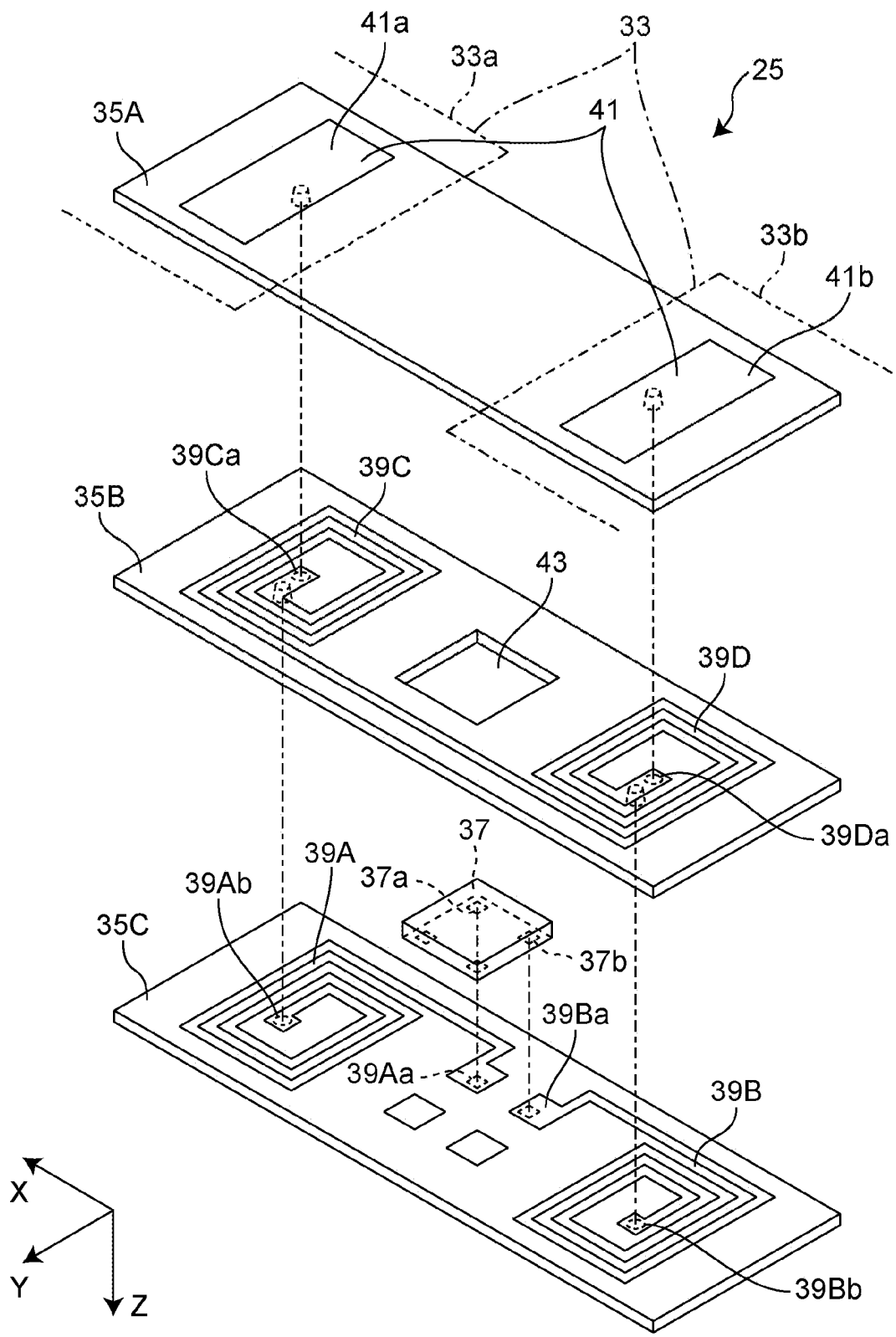
FIG. 5 is an exploded perspective view showing an RFIC package in the wireless communication device of the second exemplary embodiment.

FIG. 5 is an exploded perspective view showing the configuration of the RFIC package 25 mounted on the land patterns 33 (33a, 33b) of the antenna pattern 27. As shown in FIG. 5, the RFIC package 25 of the second embodiment is made up of a multilayer substrate composed of three layers. Specifically, the multilayer substrate of the RFIC package 25 is made of a resin material such as polyimide or liquid crystal polymer and is formed by laminating three flexible insulating sheets 35A, 35B, 35C. The insulating sheets 35A, 35B, 35C have a substantially quadrangular shape in planar view and have a substantially rectangular shape in the second embodiment. The RFIC package 25 shown in FIG. 5 shows a state in which the RFIC package 25 shown in FIG. 3 is reversed and the three layers are disassembled.

In the RFIC package 25, as shown in FIG. 5, the RFIC chip 37, multiple inductance elements 39A, 39B, 39C, 39D, and external connection terminals 41 (41a, 41b) connected to the antenna pattern 27 are formed at predetermined positions on a three-layer substrate (insulating sheets 35A, 35B, 35C).

As further shown, the external connection terminals 41 (41a, 41b) are formed on the first insulating sheet 35A that is a lowermost layer (a substrate facing the antenna pattern 27), at a position facing the land patterns 33 (33a, 33b) of the antenna pattern 27. The four inductance elements 39A, 39B, 39C, 39D are separated so that two of the elements are formed on each of the second insulating sheet 35B and the third insulating sheet 35C. In other words, the first inductance element 39A and the second inductance element 39B are formed on the third insulating sheet 35C, which is an uppermost layer (i.e., a layer shown in a lowermost portion of FIG. 4), while the third inductance element 39C and the fourth inductance element 39D are formed on the second insulating sheet 35B, which is an intermediate layer.

In the RFIC package 25 of the second embodiment, the external connection terminals 41 (41a, 41b) and the four inductance elements 39A, 39B, 39C, 39D are formed by conductor patterns made of a conductive material such as aluminum foil or copper foil.

As shown in FIG. 5, the RFIC chip 37 is mounted on the third insulating sheet 35C, which is the uppermost layer, at a central portion in the longitudinal direction (e.g., the X direction in FIG. 5). The RFIC chip 37 has a structure in which various elements are built in a semiconductor substrate made of a semiconductor such as silicon. The first inductance element 39A is formed into a spiral shape on one side (e.g., in the +X-axis direction in FIG. 5) on the third insulating sheet 35C and is connected to one input/output terminal 37a of the RFIC chip 37 via a land 39Aa. The second inductance element 39B is formed into a spiral shape on the other side (e.g., in the −X-axis direction in FIG. 5) on the third insulating sheet 35C and is connected to the other input/output terminal 37b of the RFIC chip 37 via a land 39Ba.

The spiral-shaped third inductance element 39C is formed on one side (e.g., in the +X-axis direction in FIG. 5) of the second insulating sheet 35B, which is the intermediate layer, and the spiral-shaped fourth inductance element 39D is formed on the other side of the second insulating sheet 35B (e.g., in the −X-axis direction in FIG. 5). An outer circumferential end part of the spiral-shaped third inductance element 39C and an outer circumferential end part of the spiral-shaped fourth inductance element 39D are directly connected. On the other hand, an inner circumferential end part (a land 39Ca) of the third inductance element 39C is connected via an interlayer connecting conductor such as a through-hole conductor penetrating the second insulating sheet 35B, to an inner circumferential end part (a land 39Ab) of the spiral-shaped first inductance element 39A on the third insulating sheet 35C. The inner circumferential end part (the land 39Ca) of the third inductance element 39C is connected via an interlayer connecting conductor such as a through-hole conductor penetrating the first insulating sheet 35A serving as the lowermost layer, to the first external connection terminal 41a on the first insulating sheet 35A.

An inner circumferential end part (a land 39Da) of the fourth inductance element 39D is connected via an interlayer connecting conductor such as a through-hole conductor penetrating the second insulating sheet 35B, to an inner circumferential end part (a land 39Bb) of the spiral-shaped second inductance element 39B on the third insulating sheet 35C. The inner circumferential end part (the land 39Da) of the fourth inductance element 39D is connected via an interlayer connecting conductor such as a through-hole conductor penetrating the first insulating sheet 35A serving as the lowermost layer, to the second external connection terminal 41b on the first insulating sheet 35A.

The first external connection terminal 41a on the first insulating sheet 35A is arranged to be connected to the first land pattern 33a of the first antenna pattern 27a formed on the antenna base material 23. The second external connection terminal 41b on the first insulating sheet 35A is arranged to be connected to the second land pattern 33b of the second antenna pattern 27b formed on the antenna base material 23.

The second insulating sheet 35B serving as the intermediate layer is provided with a through-hole 43 receiving the RFIC chip 37 mounted on the third insulating sheet 35C. The RFIC chip 37 is made of a semiconductor material and is arranged between the first inductance element 39A and the second inductance element 39B and between the third inductance element 39C and the fourth inductance element 39D. Therefore, the RFIC chip 37 functions as a shield, so that the magnetic field coupling and the capacitive coupling are suppressed between the first inductance element 39A and the second inductance element 39B, and similarly, the magnetic field coupling and the capacitive coupling are suppressed between the third inductance element 39C and the fourth inductance element 39D. As a result, the RFIC package 25 of the second embodiment prevents the pass band of the communication signals from narrowing and makes the pass band wide.

Although the form of the RFIC package 25 mounted on the antenna pattern 27 is described as an example in the second embodiment, the RFIC chip 37 may directly be mounted on the antenna pattern 27. In this case, the inductor made up of the multiple inductance elements 39A, 39B, 39C, 39D in the RFIC package 25 may be configured as loop-shaped patterns on the antenna base material 23.

Referring to FIG. 3 again, the first and second antenna patterns 27a, 27b have multiple folded portions 27c. The folded portions 27c of the antenna pattern 27 are portions where the extending direction of the antenna pattern 27 is reversed.

Both the antenna pattern 27 and the conductor pattern 45 are formed on the surface of the antenna base material 23. Moreover, at least portions of the conductor patterns 45 are arranged on the outer side in a meander amplitude direction relative to the folded portions 27c of the meander-shaped antenna pattern 27. In this way, the conductor patterns 45 are arranged on both sides (e.g., in the Y direction) of the meander-shaped antenna pattern 27 extending in the X direction in a meandering manner. The conductor patterns 45 are arranged on both sides along the extending direction of the antenna pattern 27. In this case, the extending direction of the meander-shaped antenna pattern 27 is defined as the X direction extending in a meandering manner. The antenna pattern 27 extending in a meandering manner is arranged between the conductor patterns 45. In an exemplary aspect, a distance from the antenna pattern 27 to the conductor patterns 45 and the line patterns 47 are 150 μm, for example.

The first and second antenna patterns 27a, 27b have straight-line portions 27d. For example, the straight-line portions 27d are parallel to the width direction (Y direction) of the antenna base material 23 and extend in the meander amplitude direction. The inter-line patterns 47 are formed between the adjacent straight-line portions 27d of each of the first and second antenna patterns 27a, 27b. The inter-line patterns 47 are arranged between the straight-line portions 27d that are facing regions of each of the first and second antenna patterns 27a, 27b.

As with the antenna pattern 27, the conductor patterns 45 and the inter-line patterns 47 are made of a conductive material, such as aluminum foil or copper foil according to an exemplary aspect. When made of aluminum foil, the thickness of the conductor patterns 45 and the inter-line patterns 47 is 6 µm, for example. The conductor patterns 45 and the inter-line patterns 47 are formed into a loop shape.

As further shown, the conductor patterns 45 include a first conductor pattern 45a, a second conductor pattern 45b, a third conductor pattern 45c, and a fourth conductor pattern 45d having respective different perimeters.

The first conductor pattern 45a has a recess 45aa surrounding the leading end part 27e of the first or second antenna pattern 27a, 27b and a recess 45ab extending along the folded portion 27c of the first or second antenna pattern 27a, 27b. Additionally, the first conductor pattern 45a has a protruding part 45ac extending in a protruding shape along the outside of the outermost straight-line portion 27d of the first or second antenna pattern 27a, 27b in the longitudinal direction (e.g., the X direction), and a protruding part 45ad and a protruding part 45ae extending in a protruding shape from a lateral side between the two adjacent folded portions 27c in the first or second antenna pattern 27a, 27b.

The second conductor pattern 45b has a recess 45ba extending along the folded portion 27c of the first or second antenna pattern 27a, 27b and a recess (e.g., an L-shaped portion) 45bb extending along a portion of the folded portion 27c. Additionally, the second conductor pattern 45b has a protruding part 45bc extending in a protruding shape from a lateral side between the two adjacent folded portions 27c in the first or second antenna pattern 27a, 27b.

The third conductor pattern 45c has a recess 45ca extending along the folded portion 27c of the first or second antenna pattern 27a, 27b and a protruding part 45cb extending in a protruding shape from a lateral side between the two adjacent folded portions 27c in the first or second antenna pattern 27a, 27b. A straight-line portion 45cba of the protruding part 45cb of the third conductor pattern 45c and the recess 45bb of the second conductor pattern 45b are arranged to surround the outside of the folded portion 27c.

The fourth conductor pattern 45d has a recess 45da extending along a portion of the folded portion 27c. The protruding part 45ae and a straight-line portion 45aea of the first conductor pattern 45a and the recess 45d of the fourth conductor pattern 45d are arranged to surround the outside of the folded portion 27c.

According to the exemplary aspect, the physical perimeter of each of the first to fourth conductor patterns 45a to 45d is shorter than the total length of the antenna pattern 27, which is the total length of the first antenna pattern 27a and the second antenna pattern 27b.

Furthermore, the electrical perimeter of each of the first to fourth conductor patterns 45a to 45d is shorter than one wavelength of the high frequency signal of the first frequency for communication in the 900 MHz band, for example. The electrical perimeter of each of the first to fourth conductor patterns 45a to 45d is shorter than the half wavelength of the high frequency signal of the first frequency in the 900 MHz band, for example. The electrical perimeter of each of the first to fourth conductor patterns 45a to 45d is not an integral multiple of a wavelength of a high frequency wave of a second frequency used for, for example, electromagnetic induction heating, which is higher than the first frequency in the 900 MHz band, for example. The electrical perimeter of each of the first to fourth conductor patterns 45a to 45d is longer than the half wavelength of the high frequency wave of the second frequency used for electromagnetic induction heating, for example.

The protruding part 45ae of the first conductor pattern 45a, the protruding part 45bc of the second conductor pattern 45b, and the protruding part 45cb of the third conductor pattern are arranged such that a capacitance is generated between the adjacent folded portions 27c in the meander-shaped first or second antenna patterns 27a, 27b. Since the conductor patterns are arranged such that a capacitance is generated between the adjacent folded portions 27c, discharge is prevented from occurring between the adjacent folded portions 27c.

The protruding part 45ad of the first conductor pattern 45a is arranged such that a capacitance is generated between the folded portion 27c and the leading end part 27e of the first or second antenna pattern 27a, 27b. Since the conductor patterns are arranged such that a capacitance is generated between the folded portion 27c and the leading end part 27e, discharge is prevented from occurring between the folded portion 27c and the leading end part 27e.

The inter-line patterns 47 include inter-line patterns 47a, 47b, and 47c having different lengths in the width direction (e.g., in the Y direction) of the antenna base material 23. The perimeters of the inter-line patterns 47a, 47b, and 47c are made equal to or less than a quarter wavelength of the frequency used for electromagnetic induction heating, for example. In the meander amplitude direction (e.g., in the Y direction) of the antenna pattern 27, the length of the first antenna pattern 27a is longer than the length of each of the inter-line patterns 47a, 47b, 47c in the Y direction. The inter-line patterns 47 are made up of closed loop patterns. Therefore, when operating as a magnetic field antenna, the inter-line patterns are deteriorated in Q characteristic of an antenna coil and therefore has an action of converting magnetic field energy into heat due to a magnetic loss.

As further shown, loop-shaped first shield patterns 49 are formed around the land patterns 33. As with the antenna pattern 27, the first shield patterns 49 are made of a conductive material such as aluminum foil or copper foil. The first shield patterns 49 have a completely closed loop shape.

A current flows through the first shield patterns 49 in a direction of canceling a magnetic field generated by the current flowing between the antenna pattern 27 and the land patterns 33a, 33b. Since the first shield patterns 49 have a shape closer to a square as compared to the inter-line pattern 47a, the Q characteristic of the inductance element formed by this pattern becomes higher than the Q characteristic of the inductance element constituted by the inter-line patterns 47a to 47c, and this makes it easier to suppress heat generation and ignition due to magnetic loss. Since the first shield patterns 49 are arranged in the central portion of the antenna base material 23 in the longitudinal direction, even if an electromagnetic wave in a frequency band higher than the communication frequency is applied, no heat generation leading to a disconnection occurs due to an eddy current.

An extending part 27aa of the first antenna pattern 27a extending from the first land pattern 33a and an extending part 27ba of the second antenna pattern 27b extending from the second land pattern 33b are parallel to each other and arranged to extend in opposite directions according to an exemplary aspect.

On the outside of the outermost straight-line portion 27d of the antenna pattern 27a in the longitudinal direction of the antenna base material 23, second shield patterns 51 are arranged along the straight-line portion 27d of the antenna pattern 27a. The second shield patterns 51 can reduce an influence of radio waves in a direction perpendicular to the amplitude direction of the meander shape of the antenna pattern 27.

The antenna pattern 27, the conductor pattern 45, the inter-line pattern 47, and the shield pattern 49 formed on the surface of the antenna base material 23 configured as described above have a shape preventing concentration of an electric field, have no acute-angled portion particularly in bent portions and edge parts of outer peripheral portions, and are entirely composed of gently curved surfaces.

The RFID tag 21 of the second embodiment can be used for a commercial product such as boxed meals at a convenience store, for example. Therefore, it is expected that the RFID tag 21 is dielectrically heated by, for example, a microwave oven, which is an electromagnetic wave heating device for cooking. The frequency of microwave, i.e., electromagnetic wave used in the microwave oven, is in a frequency band of 2.4 to 2.5 GHz, which is a frequency band higher than the communication frequency.

Figure 6:
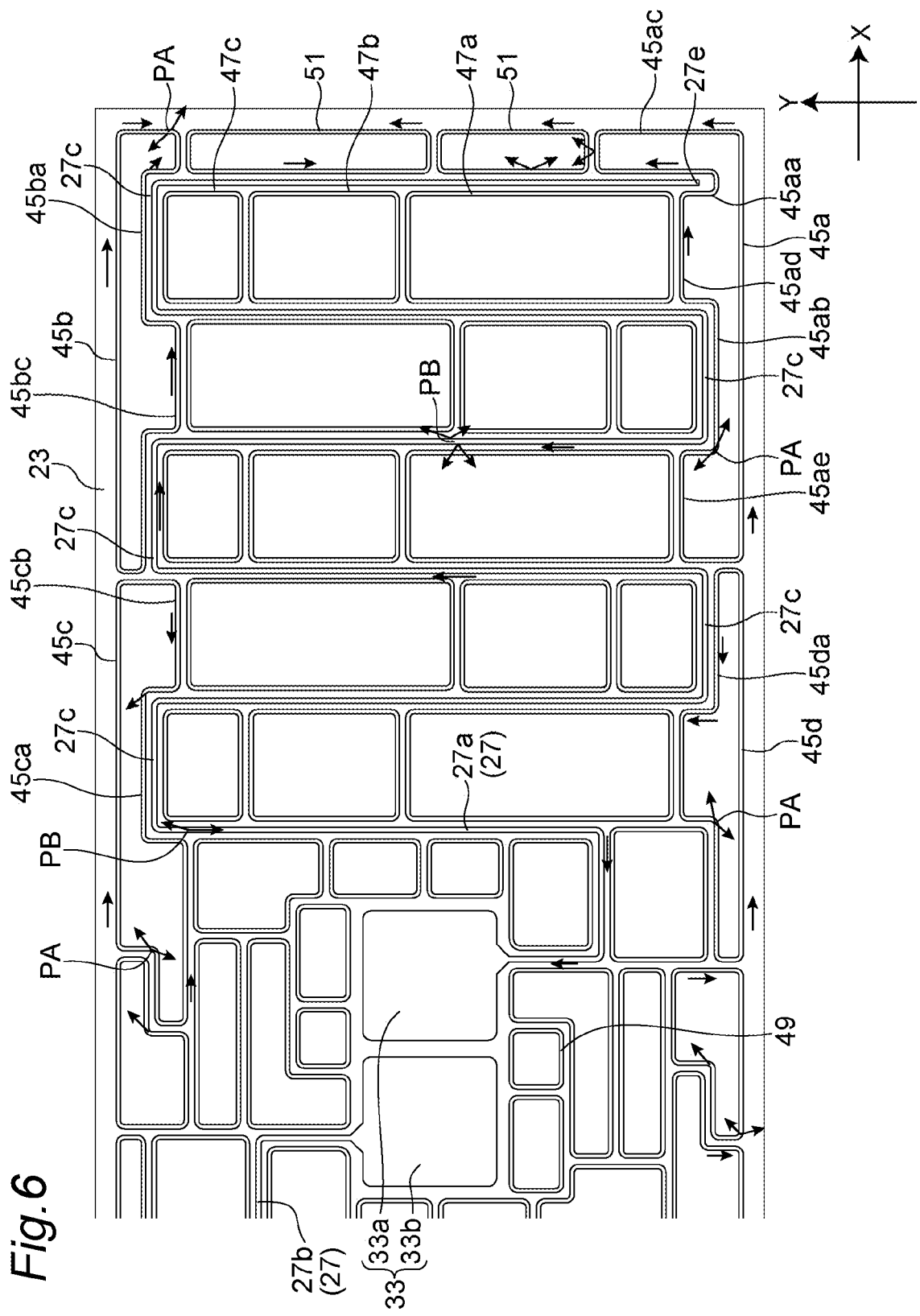
FIG. 6 is a view showing how the current flows when a signal of a heating frequency (2.4 GHz) used in an electromagnetic heating device is received in the wireless communication device of the second exemplary embodiment.
Figure 7:
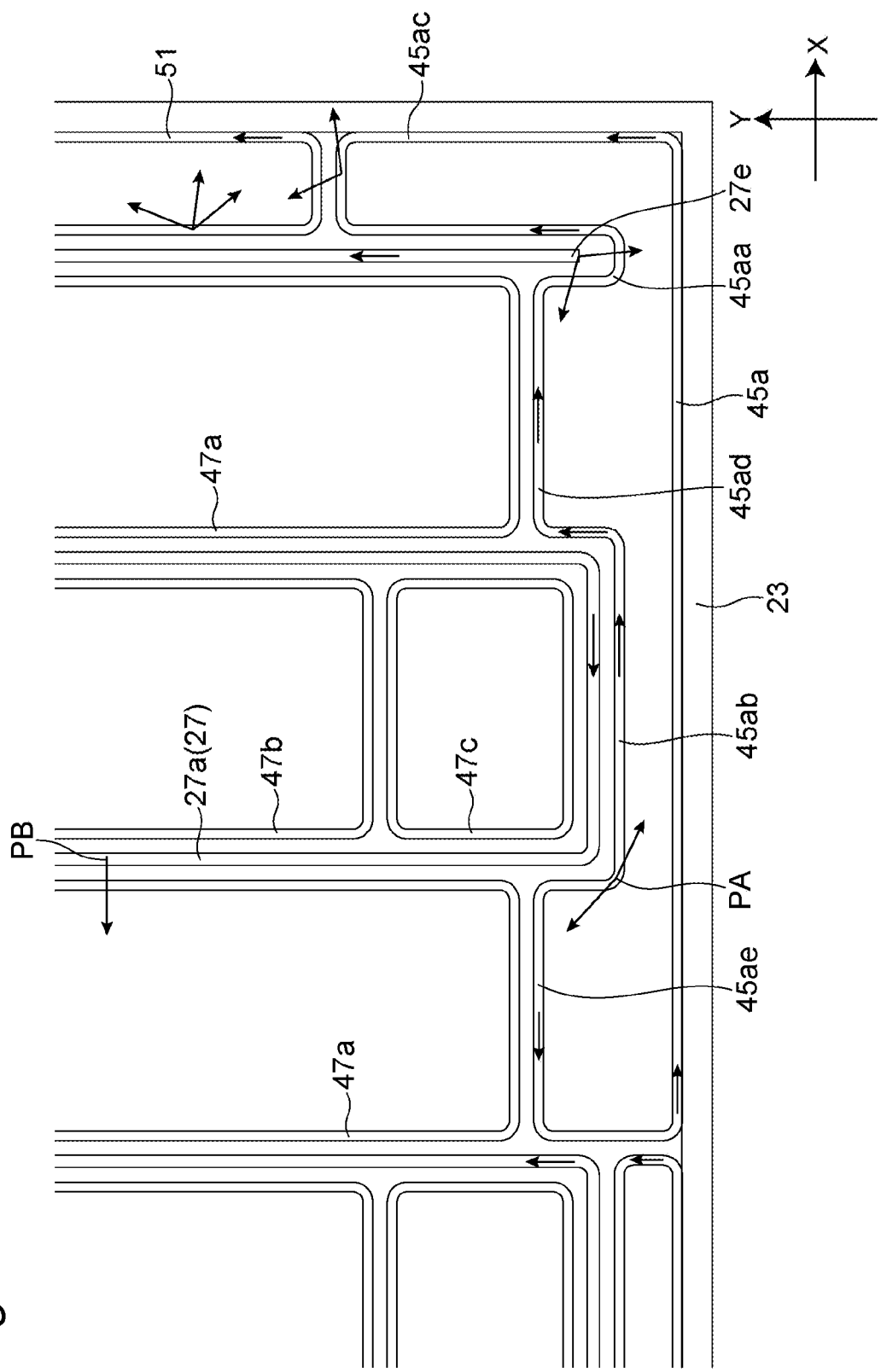
FIG. 7 is a partial enlarged view of FIG. 6.
Figure 8:
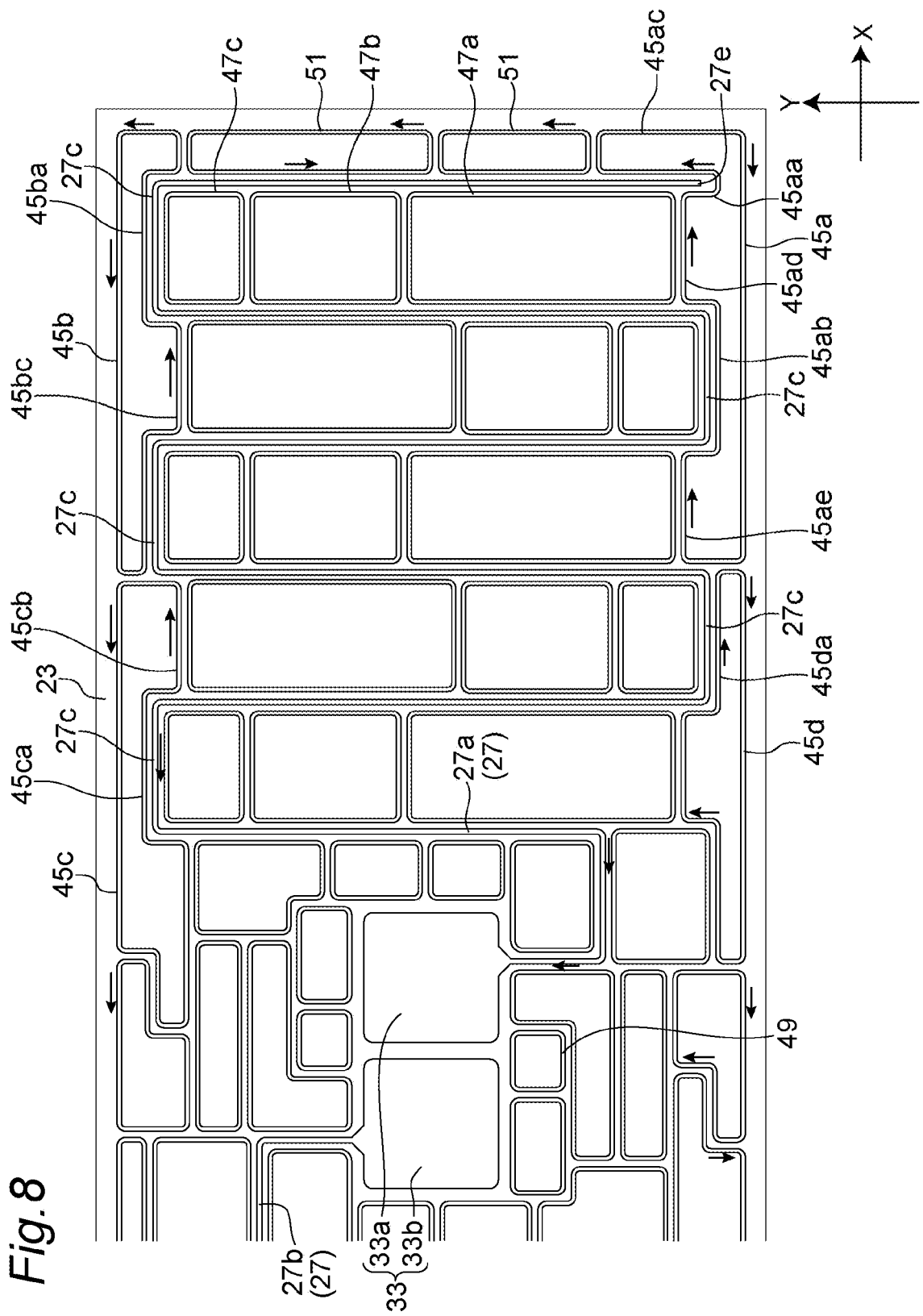
FIG. 8 is a view showing how the current flows when a signal of a UHF band communication frequency (920 MHz) is received in the wireless communication device of the second exemplary embodiment.

FIG. 6 is an explanatory view showing directions of currents flowing through the antenna pattern 27a, the conductor patterns 45, and the second shield patterns 51 shown in FIG. 3 at the time of reception of electromagnetic wave having a high frequency (2.4 GHz) higher than the communication frequency. FIG. 7 is a partially enlarged view of FIG. 6. FIG. 8 is an explanatory view showing the directions of currents flowing through the antenna pattern 27a and the conductor pattern 45a shown in FIG. 2 at the time of reception of electromagnetic wave having the communication frequency (920 MHz).

As shown in FIGS. 6 and 7, when an electromagnetic wave in a frequency band higher than the communication frequency is applied to the antenna pattern 27, a magnetic field coupling between the antenna pattern 27 and the conductor pattern 45 causes an eddy current having a reversal point PA, at which the direction of the current is reversed, to flow in the conductor pattern 45. Moreover, a magnetic field is generated from the conductor pattern 45 due to this eddy current. Since the magnetic field is generated, a portion of the electric power supplied to the antenna pattern 27 turns into magnetic field energy, generates heat due to a magnetic loss of the conductor pattern 45, and gradually loses energy. In this way, the energy in the frequency band higher than the communication frequency can be attenuated.

In each of the first to fourth conductor patterns 45a to 45d, the reversal point PA making the direction of the induced current opposite moves on each of the first to fourth conductor patterns 45a to 45d over time. The movement of the reversal point PA affects an induced current of a standing wave generated in the antenna pattern 27.

A position indicated by a point PB of FIG. 6 is a position of a node of the standing wave of the induced current generated in the antenna pattern 27a. Since the point PB is the position of the node of the induced current, the current value is zero, and the direction of the induced current is reversed at the point PB. Since the reversal point PA moves on the conductor pattern 45, the amplitude of the standing wave generated from the antenna patterns 27a, 27b changes. As a result, the electric fields radiated from the two antenna patterns 27a and 27b are not synchronized with each other, so that the electric fields cancel each other, and the electric field intensity radiated from the antenna base material 23 is reduced.

In the RFID tag 21 of the second embodiment, for example, the frequency band higher than 1.1 GHz is attenuated. Particularly, the frequency of the heating electromagnetic wave (2.4 to 2.5 GHz) used in microwave ovens heating commercial products such as boxed meals is considerably attenuated.

The physical perimeter of each of the first to fourth conductor patterns 45a to 45d is shorter than the physical total length of the antenna pattern 27, which is the total length of the first antenna pattern 27a and the second antenna pattern 27b. Therefore, in the frequency band higher than the communication frequency, the first to fourth conductor patterns 45a to 45d function as a magnetic field antenna. The loop-shaped conductor patterns 45 are arranged along an outer edge part of the antenna pattern 27. In this way, by arranging the closed loop-shaped conductor patterns 45 serving as a magnetic field antenna at the frequency of the heating electromagnetic wave in the vicinity of the field emission type antenna, the antenna radiation efficiency of the field emission antenna at the frequency of the heating electromagnetic wave is considerably attenuated to make it difficult to receive the energy of the heating electromagnetic wave.

According to the exemplary aspect, the physical perimeter of the loop-shaped conductor pattern 45 is smaller than one wavelength of the high frequency wave of the UHF band frequency used for communication. As a result, the conductor pattern 45 is configured to function as a magnetic field antenna at a frequency higher than the UHF band frequency, and the radiation efficiency in the frequency band higher than the UHF band frequency can be attenuated. As compared to the difference between the perimeter of the loop-shaped conductor pattern and the half wavelength of the UHF band frequency used for communication, the difference between the perimeter of the loop-shaped conductor pattern and the half wavelength of the frequency of the heating electromagnetic wave may be smaller. As a result, the radiation efficiency in the vicinity of the frequency of the heating electromagnetic wave can be attenuated as compared to the vicinity of the UHF band frequency.

The operating principle of the conductor pattern will be described in more detail. As shown in FIG. 3, in the RFID tag 21 of the second embodiment, the multiple loop-shaped conductor patterns 45 are arranged outside the folded portions 27c of the antenna pattern 27, so that each of the conductor patterns 45 is coupled through a magnetic field to the antenna pattern 27.

The electrical length of each of the conductor patterns 45 is set shorter than ½ wavelength ($\lambda$/2) of the frequency (2.4 to 2.5 GHz) of the heating electromagnetic wave used in the microwave oven. The conductor patterns operate as magnetic field antennas in a wide band of 2.4 to 2.5 GHz, the multiple magnetic field antennas are formed in the vicinity of the first antenna pattern 27a operating as an electric field antenna. As a result, the first antenna pattern 27a serving as the electric field antenna pattern is drastically deteriorated in the antenna radiation characteristics. The received energy of the first antenna pattern 27a serving as the electric field antenna pattern is consumed as heat in the magnetic field antennas. As a result, a reception level of electromagnetic waves of the electric field antenna pattern is attenuated, and heat generation points are dispersed.

Figure 9:
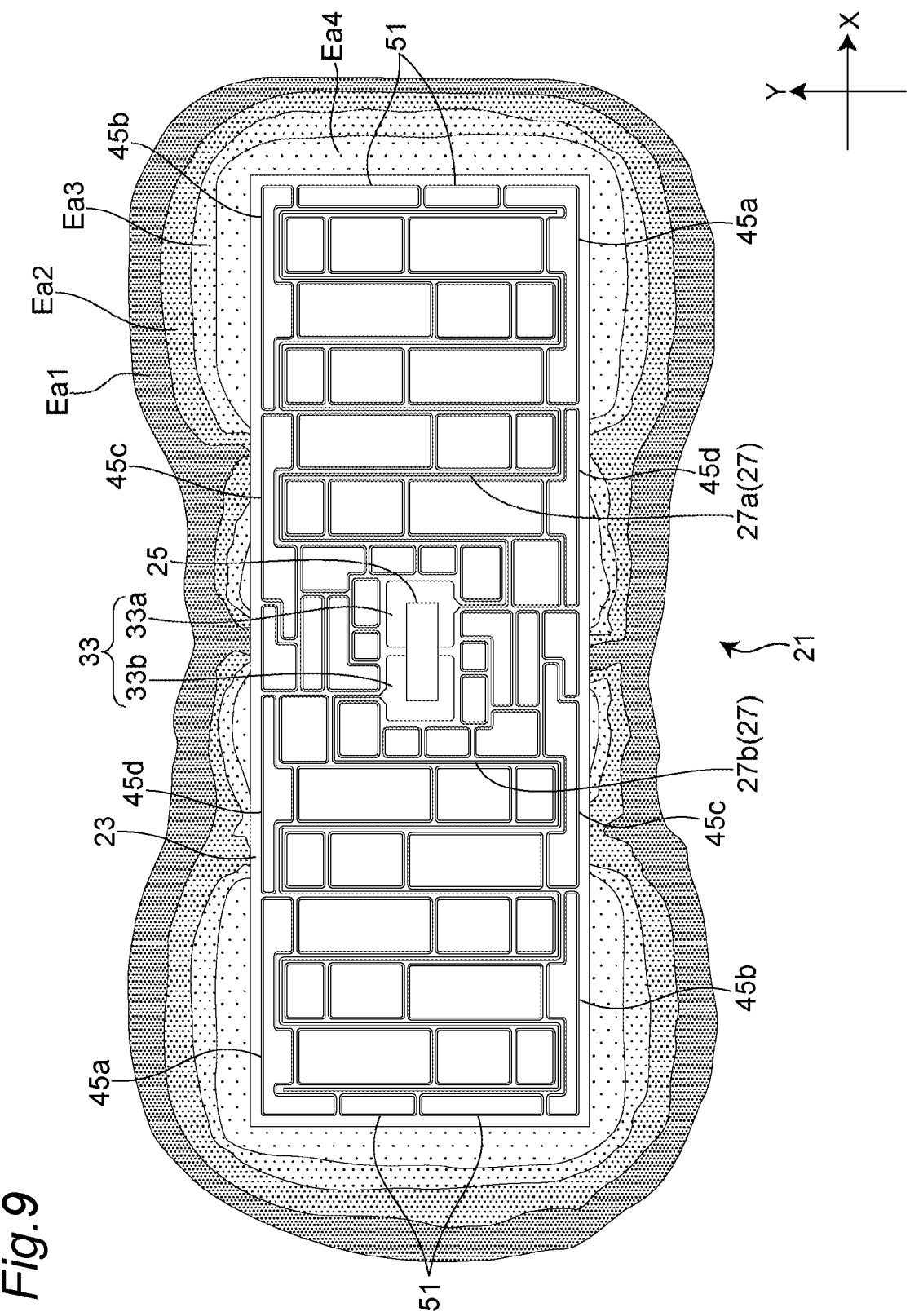
FIG. 9 is a view showing field emission when the signal of the UHF band communication frequency (920 MHz) is received in the wireless communication device of the second exemplary embodiment.
Figure 10:
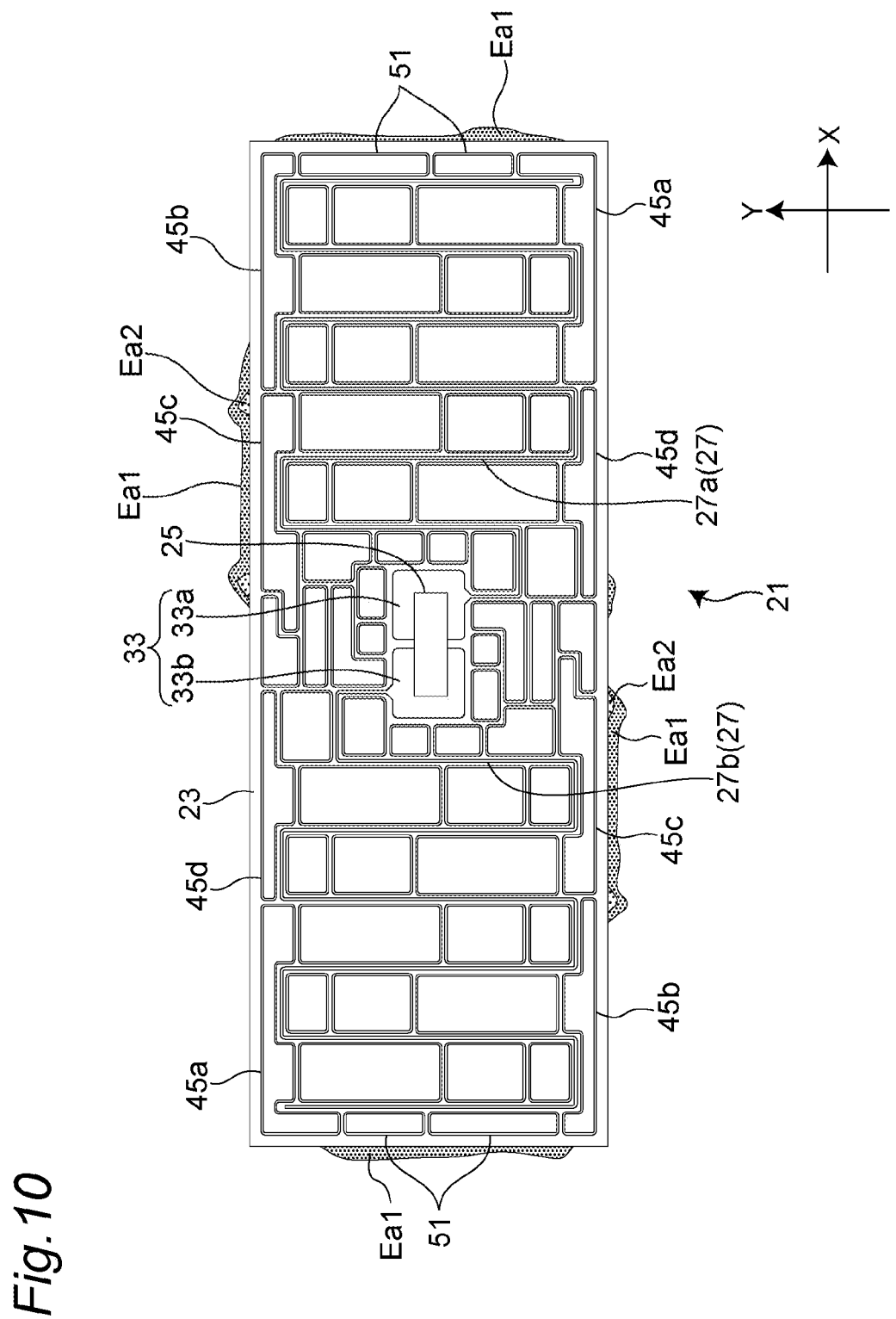
FIG. 10 is a view showing field emission when a signal of a heating frequency (2.4 GHz) used in an electromagnetic wave heating device is received in the wireless communication device of the second exemplary embodiment.

FIG. 9 is a view obtained from a simulation experiment for the intensity distribution of the electric field radiated from the antenna pattern 27 when a signal of the UHF band communication frequency (920 MHz) is received in the RFID tag 21 of the second embodiment. FIG. 10 is a view obtained from a simulation experiment for the intensity distribution of the electric field radiated from the antenna pattern 27 when high frequency waves of the heating frequency (2.4 GHz) used in the microwave oven are received.

As shown in FIG. 9, when an electric field in the UHF band is applied, an electric field is also radiated from the antenna pattern 27, and it is understood that the antenna pattern 27 functions as an antenna. Electric field regions Ea1, Ea2, Ea3, Ea4 are generated around the antenna base material 23, and the electric field intensity becomes weaker as a distance from the antenna base material 23 increases. Therefore, in the electric field regions Ea1 to Ea4, the electric field intensity in the electric field region Ea4 is the strongest, and the electric field intensity in the electric field region Ea1 is the weakest.

As shown in FIG. 10, when the electric field of 2.4 GHz is applied, the intensity of the electric field radiated from the antenna pattern 27 is smaller than when the electric field of the UHF band is applied. The electric field regions Ea3, Ea4 are not generated around the antenna base material 23. Therefore, it is understood that the function of the antenna pattern 27 as an antenna is significantly reduced as compared to when the electric field of the UHF band is applied.

Figure 11:
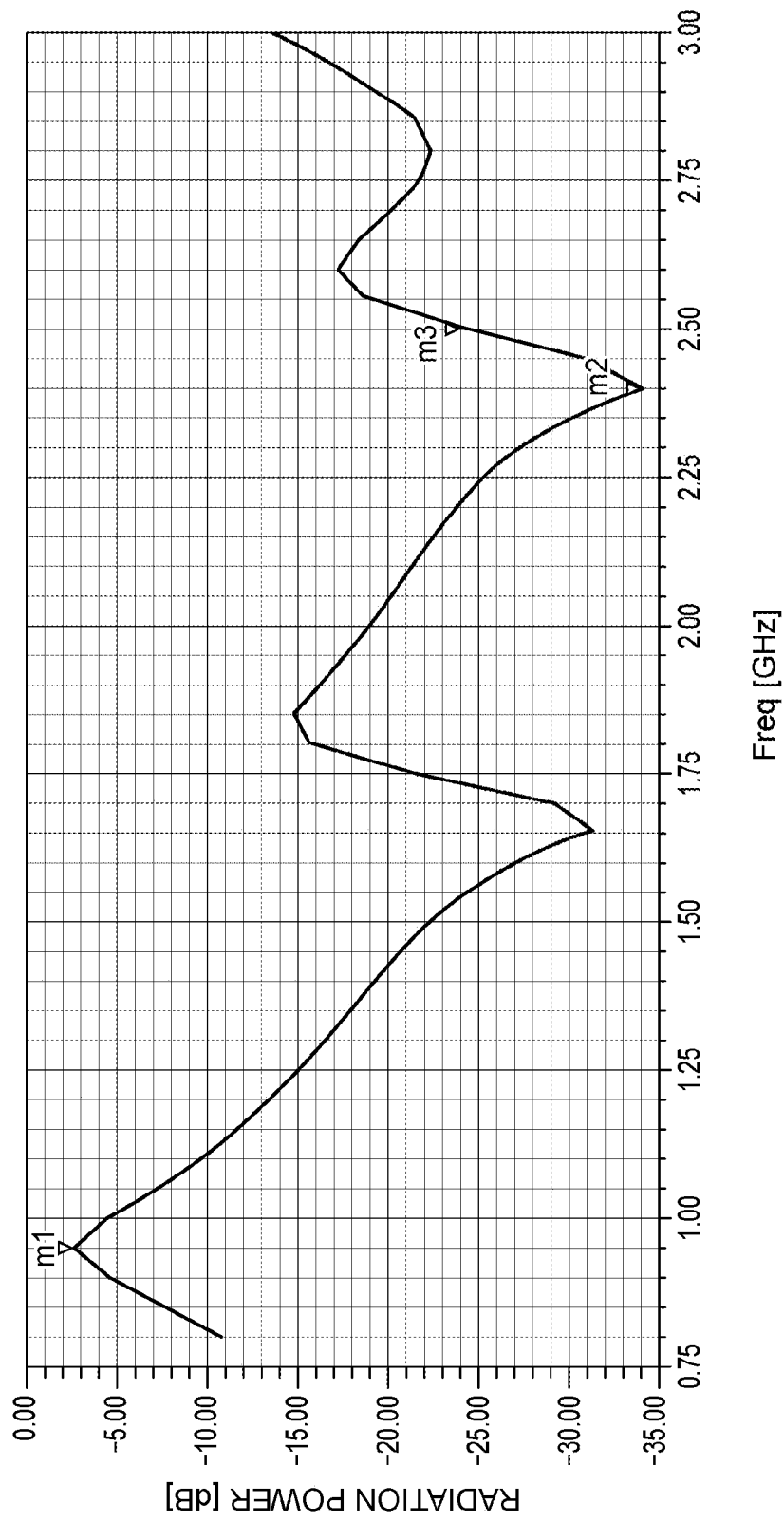
FIG. 11 is a frequency characteristic diagram showing a result of a simulation experiment in the wireless communication device of the second exemplary embodiment.

FIG. 11 is a frequency characteristic diagram showing a result of the simulation experiment conducted on the RFID tag 21 of the second embodiment. In the frequency characteristic diagram of the antenna radiation efficiency shown in FIG. 11, a feeding level is −2.7 DB at the frequency of 0.95 GHz indicated by Vm1. The feeding level is −34 dB at the frequency of 2.4 GHz indicated by Vm2, which is the frequency of the heating electromagnetic wave used in the microwave oven and is −24 dB at the frequency of 2.5 GHz indicated by Vm3, and it can be understood that considerable attenuation is achieved. It can also be understood that attenuation is achieved not only in the frequency band of 2.4 to 2.5 GHz but also in the frequency band higher than the communication frequency. For example, the attenuation to −10 dB or more is achieved for a frequency of about 1.2 GHz or higher, for example.

As described above, it can be understood that in the RFID tag 21 of the second embodiment, a high frequency signal (e.g., a radio signal) having a UHF band communication frequency (900 MHz band, e.g., 950 MHz) can be transmitted and received and that the feeding level is considerably attenuated (about −24 to −34 dB) at the heating frequency (2.4 to 2.5 GHz) used in the electromagnetic heating device microwave oven. This indicates that the power of 1000 W of the electromagnetic wave heating device is attenuated to 4 W to 0.4 W or less, which means that rapid overheating is unlikely to occur and that ignition hardly occurs.

As described above, in the RFID tag 21 of the second embodiment, the heating frequency (e.g., 2.4 to 2.5 GHz) used in the microwave oven is significantly attenuated (about −24 to −34 dB); however, the feeding level is not completely zero. Therefore, when the RFID tag 21 of the second embodiment is dielectrically heated together with a commercial product by the microwave oven, a minute current flows through the antenna pattern 27 (27a, 27b). This minute current is transmitted from the antenna pattern 27 through capacitive coupling to the inter-line patterns 47, generates heat due to the magnetic loss of the inter-line patterns 47 forming magnetic field antennas, and gradually loses energy.

Figure 12:
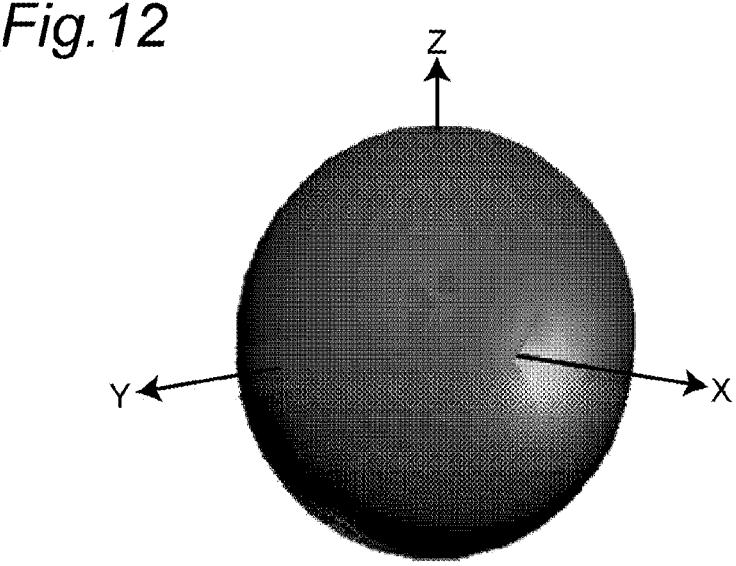
FIG. 12 is a diagram showing gains in all directions in the wireless communication device of the second exemplary embodiment.
Figure 13:
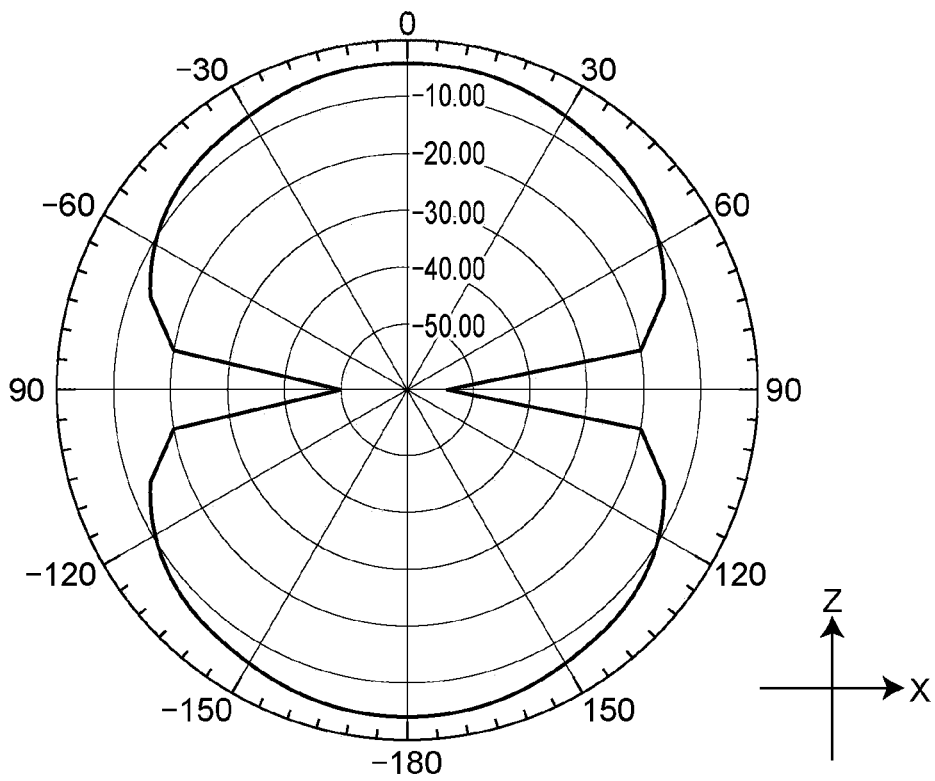
FIG. 13 is a diagram showing the gain on the X-Z plane of FIG. 12 for the wireless communication device of the second exemplary embodiment.

FIG. 12 is a diagram showing gains in all directions for the RFID tag 21 of the second embodiment. The X direction in FIG. 12 indicates the longitudinal direction of the RFIC package 25 in the RFID tag 21. As shown in FIGS. 12 and 13, the RFID tag 21 has a high gain in the Y direction and the Z direction and has a wide directivity in the Y direction and the Z direction. Although the gain is slightly lower only in the longitudinal direction (e.g., the X direction) as compared to the other directions, the RFIC package 25 generally has a wide directivity.

As described above, the RFID tag 21 of the second embodiment is a wireless communication device for transmitting and receiving a high frequency signal having the first frequency for communication in the 900 MHz band, for example. The RFID tag 21 includes the antenna base material 23, the antenna pattern 27 formed on the antenna base material 23, and the loop-shaped conductor patterns 45 that are formed on the same surface of the antenna base material 23 on which the antenna pattern 27 is formed and that are arranged on both sides of the antenna pattern 27 along the extending direction of the antenna pattern 27. The physical perimeter of the conductor patterns 45 is shorter than the total length of the antenna pattern 27. With this configuration, even if the electromagnetic wave having the second frequency higher than the frequency for communication is applied to the RFID tag 21, the conductor patterns 45 generate magnetic fields as magnetic field antennas, and therefore, the antenna pattern 27 is deteriorated in radiation characteristics at the second frequency. Therefore, since the antenna pattern 27 does not function as an antenna at the second frequency, the accumulation of energy of the electromagnetic wave of the second frequency can be reduced in the antenna base material 23. As a result, the commercial product can be prevented from catching fire.

When the RFID tag 21 is dielectrically heated by the electromagnetic wave heating device, induced currents flow through the conductor patterns 45. As a result, the conductor patterns 45 serves as small magnetic field antennas at the frequency of the electromagnetic wave heating device, and the electric field energy radiated by the electromagnetic wave heating device is reflected and hardly received in this configuration. As a result, the RFID tag 21 has a configuration to minimize catching fire due to the electromagnetic wave heating device and is constructed for reflecting or losing the received electric field energy (electric power) as magnetic field energy. Therefore, the RFID tag 21 of the second embodiment has a configuration in which the feeding level can considerably be attenuated during dielectric heating.

The RFID tag 21 includes the multiple inter-line patterns 47a to 47c, which are loop-shaped conductor patterns and therefore, even in the antenna pattern 27, the energy applied around the antenna pattern 27 can further be reduced. Since the adjacent inter-line patterns 47a/47b and 47b/47c have respective different perimeters, the inter-line patterns 47a to 47c have respective different frequencies of magnetic field antennas and form magnetic field antennas in a wide band from the 2.4 GHz band to the 2.5 GHz band or higher as a whole.

The electrical perimeter of the conductor patterns 45 is shorter than one wavelength of the high frequency signal of the first frequency for communication in the 900 MHz band, for example. Therefore, the standing wave of the high frequency signal of the first frequency is not formed in the conductor pattern 45. Therefore, the antenna pattern 27 does not prevent the transmission and reception of the high frequency signal of the communication frequency.

The electrical perimeter of the conductor patterns 45 is shorter than the half wavelength of the high frequency signal of the first frequency in the 900 MHz band, for example. As a result, the conductor patterns 45 have no reversal point at which the direction of the induced current due to the high frequency signal of the first frequency is reversed. Therefore, the influence on the standing wave generated in the antenna pattern 27 can be reduced.

It is noted that the electrical perimeter of the conductor patterns 45 is not an integral multiple of the wavelength of the high frequency wave of the second frequency used for, for example, electromagnetic induction heating, which is higher than the first frequency in the 900 MHz band, for example. As a result, the standing wave of the second frequency is not generated in the conductor pattern 45, and therefore, the accumulation of energy due to the electromagnetic wave of the second frequency can be reduced in the conductor patterns 45.

The electrical perimeter of the conductor patterns 45 is longer than the half wavelength of the high frequency wave of the second frequency used for electromagnetic induction heating, for example. As a result, an induced current is generated in the conductor patterns 45 and has a node serving as a reversal point at which a direction of a current is inversed. Since the electrical perimeter of the conductor patterns 45 is shorter than one wavelength of the high frequency of the second frequency, the standing wave of the second frequency cannot be generated in the conductor pattern 45. Therefore, this reversal point moves on the conductor pattern 45 over time. As a result, the standing wave of the induced current generated on the antenna pattern 27 is also affected, so that the electric field radiated from the antenna pattern 27 can be reduced.

Moreover, the antenna pattern 27 extends in a meander shape, and at least portions of the conductor patterns 45 are arranged on the outer side in the meander amplitude direction relative to the folded portions 27c of the meander-shaped antenna pattern 27. Therefore, the conductor patterns 45 can reduce the electromagnetic waves of the second frequency received in the meander amplitude direction by the antenna pattern 27.

The conductor patterns 45a, 45b, 45c, 45d having respective different perimeters are arranged along the longitudinal direction of the outer edge part of the antenna base material 23. Since the conductor patterns 45a, 45b, 45c, 45d different in perimeter are arranged, a relative position of the reversal point moving on each of the conductor patterns varies over time, and therefore, the standing wave of the induced current generated in the antenna pattern 27 can further be averaged and reduced due to the influence of the magnetic fields having different phases generated from the multiple conductor patterns.

The conductor pattern 45a has the protruding part 45ae protruding inward from the outside in the meander amplitude direction, and the protruding part 45ae of the conductor pattern 45a is arranged between the adjacent folded portions 27c of the antenna pattern 27. Since each of the adjacent folded portions 27c and the protruding part 45ae of the conductor pattern 45a are capacitively coupled, when the electromagnetic wave of the second frequency is applied, concentration of an electric field is suppressed between the adjacent folded portions 27c, and discharge can be prevented from occurring.

The loop-shaped second shield patterns 51 are arranged along the width direction of the outer edge part of the antenna base material 23. As a result, the second shield patterns 51 serve as magnetic field antennas to receive the electromagnetic wave of the second frequency propagating in the direction perpendicular to the meander amplitude direction of the antenna pattern 27. Therefore, the energy of the electromagnetic waves of the second frequency received by the antenna pattern 27 can be reduced.

Since the RFID tag is configured as described above, even when a commercial product having the RFID tag 21 of the second embodiment attached thereto is dielectrically heated in the electromagnetic wave heating device (e.g., a microwave oven), occurrence of discharge in the RFID tag 21 is significantly suppressed, and the risk of ignition of the commercial product can be prevented.

Figure 14:
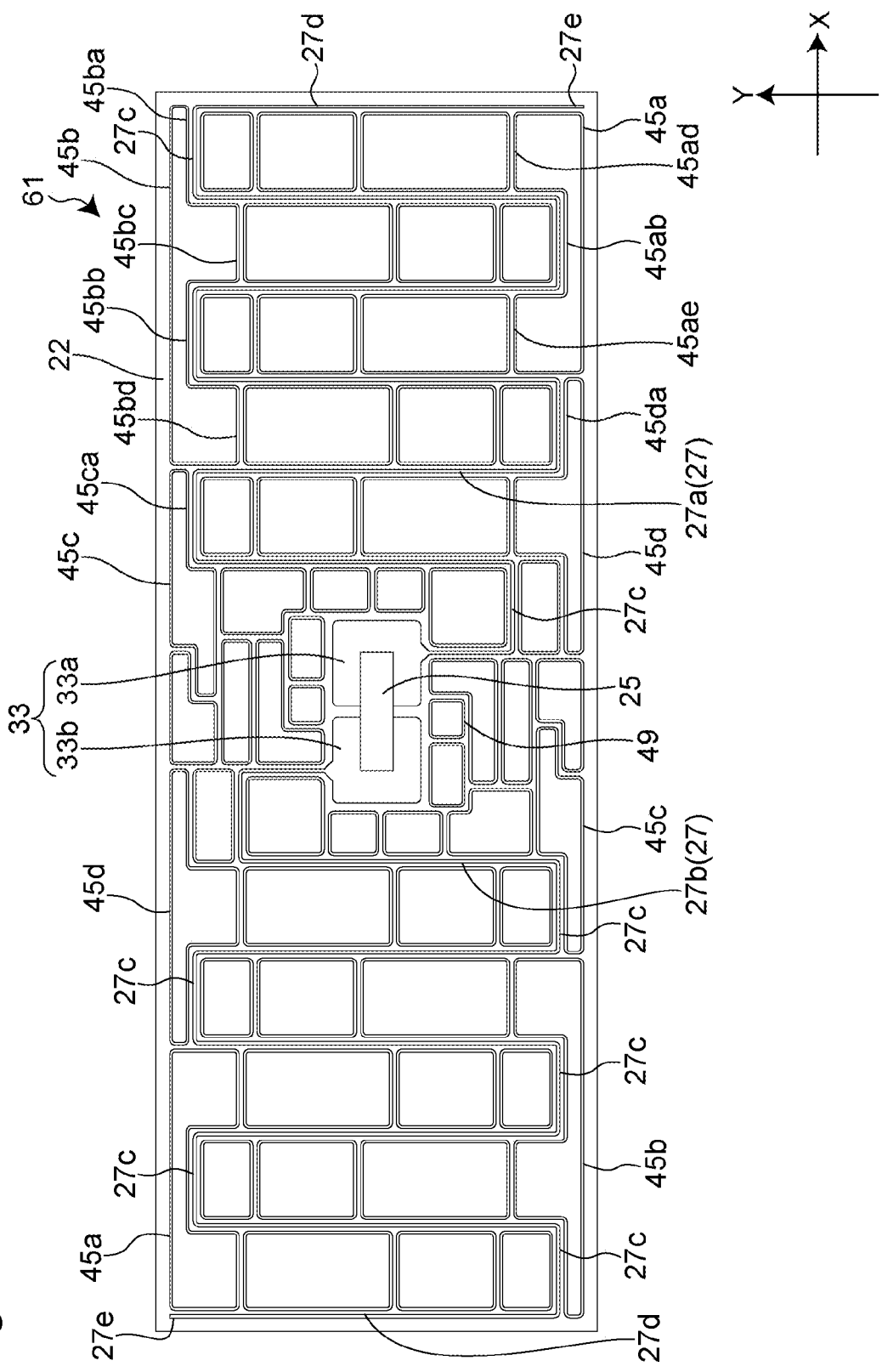
FIG. 14 is a plan view showing a wireless communication device (RFID tag) of a first modification of the second exemplary embodiment.

A first modification of the second embodiment will now be described. FIG. 14 is a plan view showing a configuration of a wireless communication device (i.e., an RFID tag) of the first modification of the second embodiment. An RFID tag 61 in the first modification of the second embodiment has a configuration in which the second shield patterns 51 are omitted from the RFID tag 21 of the second embodiment. Additionally, the recess 45aa and the protruding part 45ac of the first conductor pattern 45a are omitted. The other elements are substantially the same as the RFID tag 21 of the second embodiment.

In the RFID tag 61, the recess 45ba of the second conductor pattern 45b extends along a portion of the folded portion 27c of the first or second antenna pattern 27a, 27b. The recess 45bb of the second conductor pattern 45b extends along the folded portion 27c of the first or second antenna pattern 27a, 27b. Additionally, the second conductor pattern 45b has a protruding part 45bd extending in a protruding shape from a lateral side between the two adjacent folded portions 27c in the first or second antenna pattern 27a, 27b.

In the RFID tag 61, the recess 45ca of the third conductor pattern 45c extends along a portion of the folded portion 27c of the first or second antenna pattern 27a, 27b. A straight-line portion of the protruding part 45bd of the second conductor pattern 45b and the recess 45ca of the third conductor pattern 45c are arranged to surround the outside of the folded portion 27c.

The conductor patterns 45 are arranged outside the folded portions 27c of the meander-shaped first and second antenna patterns 27a, 27b. This configuration reduces the electromagnetic waves of the second frequency received in the meander amplitude direction by the antenna pattern 27. Since the first and second antenna patterns 27a, 27b of the RFID tag 61 are meander-shaped antenna patterns, the directivity in the meander amplitude direction (e.g., in the Y direction) is dominant in the antenna characteristics of the antenna pattern 27. Therefore, although the RFID tag 61 does not have the second shield pattern 51 and is thus deteriorated in the radiation characteristics as compared to the RFID tag 21 of the second embodiment, the influence of the radiation characteristics is limited.

Figure 15:
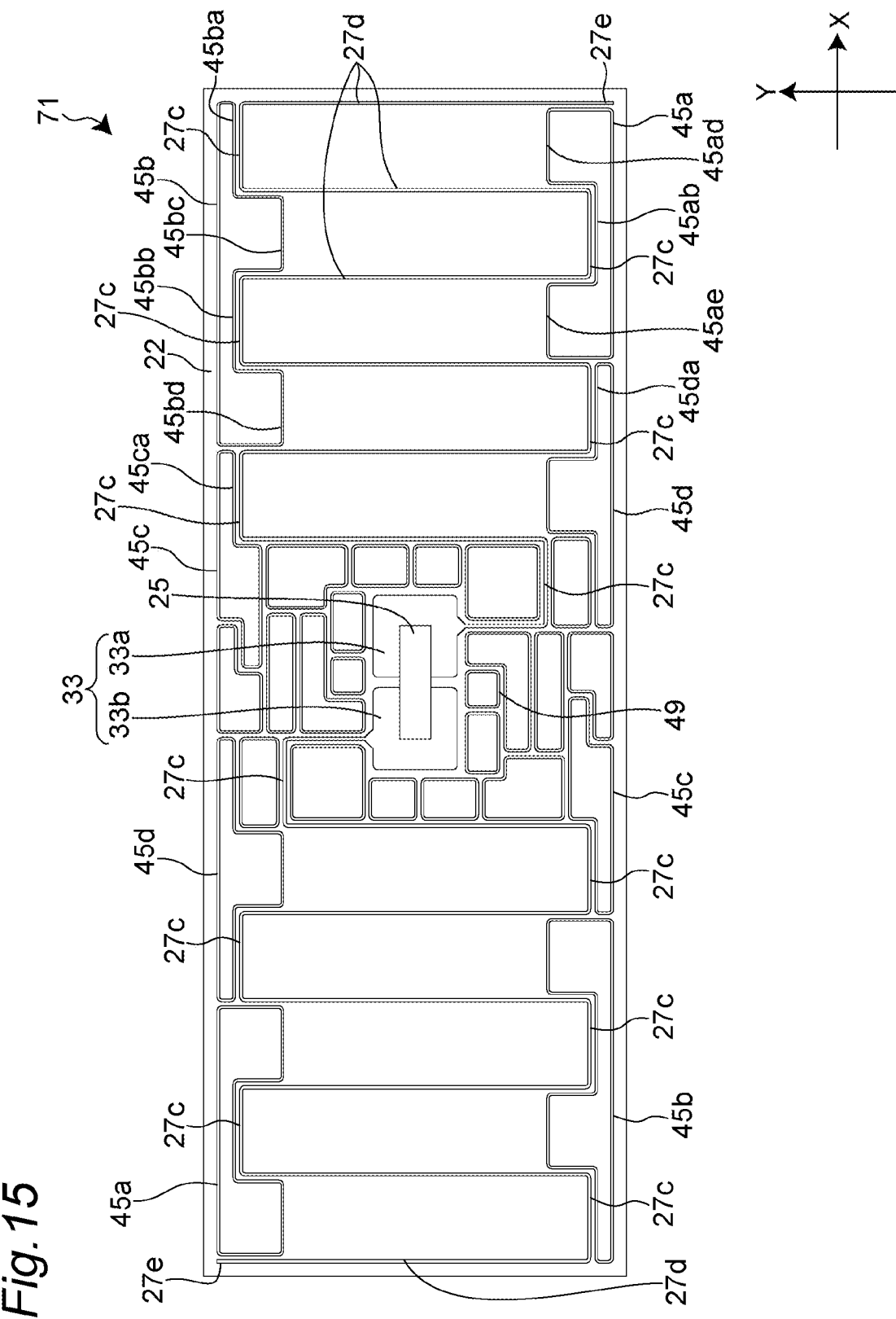
FIG. 15 is a plan view showing a wireless communication device (RFID tag) of a second modification of the second exemplary embodiment.

A second modification of the second embodiment will be described. FIG. 15 is a plan view showing a configuration of a wireless communication device (i.e., an RFID tag) of the second modification of the second embodiment. An RFID tag 71 in the second modification of the second embodiment has a configuration in which the inter-line patterns 47 are omitted from the RFID tag 61 of the first modification of the second embodiment. The other elements are substantially the same as the RFID tag 61 in the first modification of the second embodiment.

The RFID tag 71 does not have the second shield patterns 51 as with the RFID tag 61 and also does not have the inter-line patterns 47. Therefore, the RFID tag 71 is somewhat more susceptible to the electromagnetic wave of the second frequency than the RFID tag 21 of the second embodiment. However, since the conductor patterns 45 are arranged on the outside of the folded portions 27c of the meander-shaped first and second antenna patterns 27a, 27b, the electromagnetic waves of the second frequency received in the meander amplitude direction by the antenna pattern 27 can be reduced.

Figure 16:
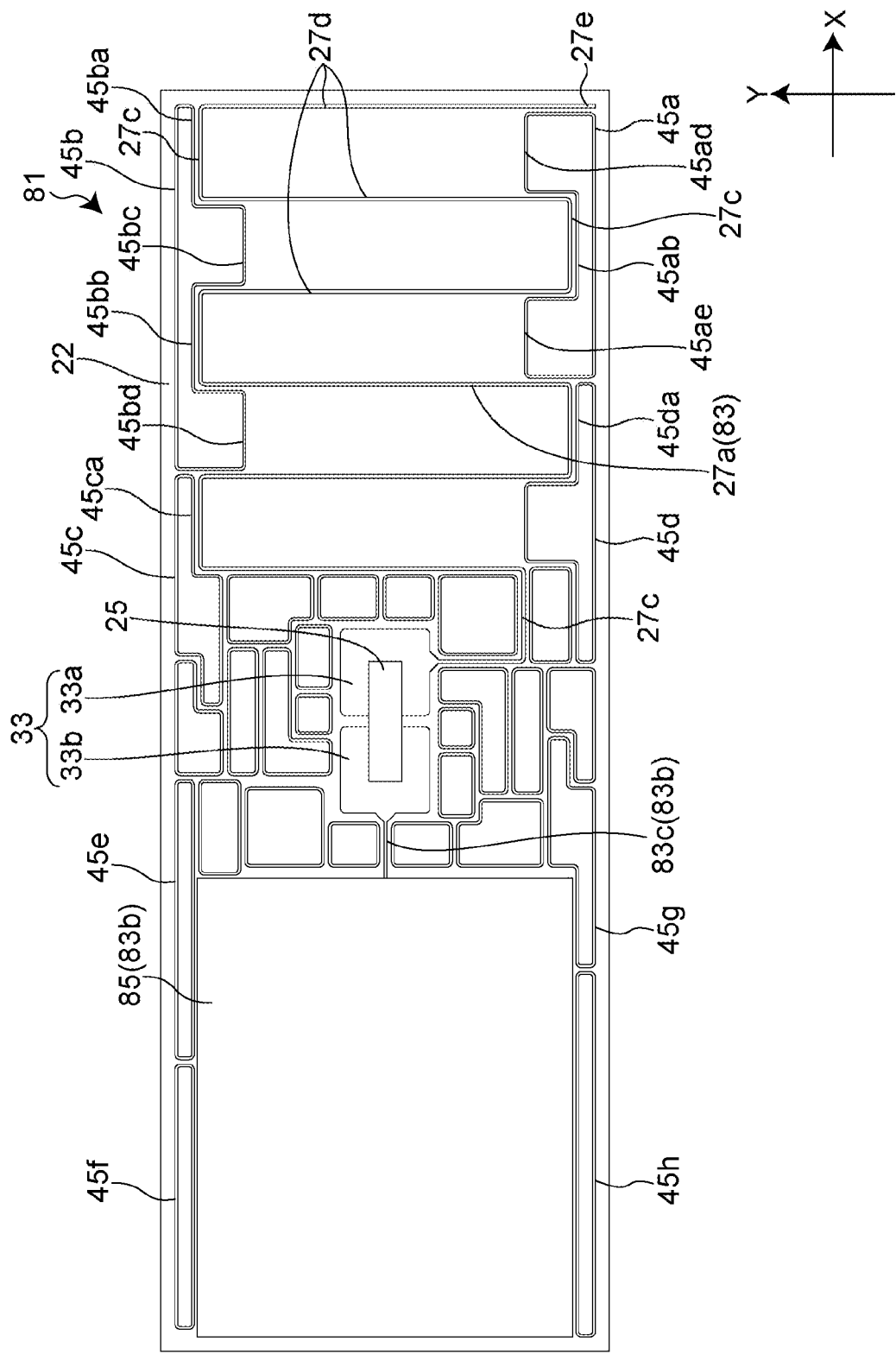
FIG. 16 is a plan view showing a wireless communication device (RFID tag) of a third modification of the second exemplary embodiment.

A third modification of the second embodiment will be now described. FIG. 16 is a plan view showing a configuration of a wireless communication device (i.e., an RFID tag) of the third modification of the second embodiment. An antenna pattern 83 of an RFID tag 81 in the third modification of the second embodiment has the first antenna pattern 27*a* and a second antenna pattern 83*b*. The second antenna pattern 83*b* has a flat plate shape rather than a meander shape.

Figure 17:
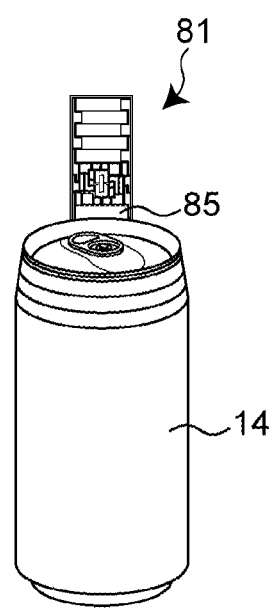
FIG. 17 is a view showing an example in which the wireless communication device of the third modification of the second exemplary embodiment is attached to a metal article.

The second antenna pattern 83*b* of the antenna pattern 83 has an extending part 83*c* led out from the second land pattern 33*b* and linearly extended toward the other end of the antenna base material 23 in the longitudinal direction, and a flat plate part 85 is formed at a leading end part of the extending part 83*c* in the extending direction. The flat plate part 85 is a portion affixed to a metal surface of an article, for example. As shown in FIG. 17, when the flat plate part 85 is affixed to an article 14 having a metal surface as an outer surface such as a can product, the metal surface of the article 14 is configured to function as a portion of an antenna.

The total outer perimeter or diagonal length of the flat plate part 85 is designed to be shorter than a quarter wavelength of a certain specific frequency higher than the first frequency for communication. For example, when the length is designed to be shorter than a quarter wavelength of the frequency of the electromagnetic wave heating device (e.g., an microwave oven), the flat plate part 85 has a size of 10 mm in length in the longitudinal direction (e.g., the X direction) and 18 mm in length in the width direction (e.g., the Y direction) of the antenna base material 23.

Moreover, the antenna base material 23 has a fifth conductor pattern 45*e*, a sixth conductor pattern 45*f*, a seventh conductor pattern 45*g*, and an eighth conductor pattern 45*h* arranged outside the flat plate part 85 along the longitudinal direction of the antenna base material 23. The fifth to eighth conductor patterns 45*e* to 45*h* are each made of a conductive material into a loop shape in the exemplary aspect.

As described above, in addition to the effect of the third modification of the second embodiment, the RFID tag 81 enables communication at the first frequency for communication even if the article is made of metal. The RFID tag 81 may be affixed to the article 17 such as boxed meals instead of the article 14 made of metal. In this case, even when the RFID tag is further heated by the microwave oven, the accumulation of the energy of applied electromagnetic waves in the RFID tag 81 can be reduced by the fifth to eighth conductor patterns 45*e* to 45*h* arranged on both sides along the longitudinal direction of the flat plate part 85.

Figure 18:
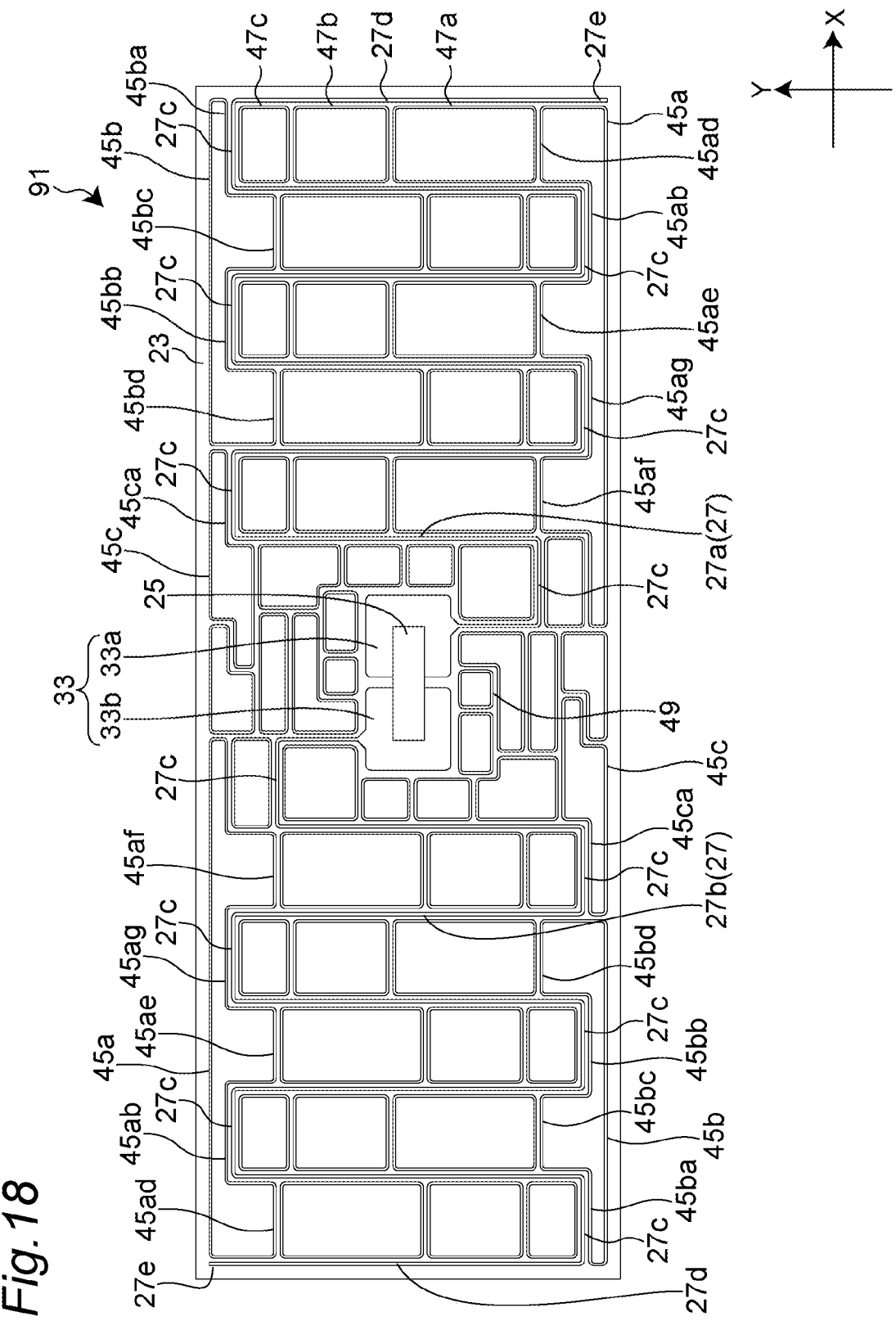
FIG. 18 is a plan view showing a wireless communication device (RFID tag) of a fourth modification of the second exemplary embodiment.

A fourth modification of the second embodiment will now be described. FIG. 18 is a plan view showing a configuration of a wireless communication device (e.g., an RFID tag) of the fourth modification of the second embodiment. The first conductor pattern 45*a* of an RFID tag 91 in the fourth modification of the second embodiment has a shape obtained by combining the first conductor pattern 45*a* and the fourth conductor pattern 45*d* of the first modification of the second embodiment into one pattern.

The first conductor pattern 45*a* of the RFID tag 91 has three protruding-shaped pattern parts, which are a protruding part 45*ad*, a protruding part 45*ae*, and a protruding part 45*af*. The first conductor pattern 45*a* of the RFID tag 91 has two recess-shaved pattern parts, which are a recess 45*ab* and a recess 45*ag* extending along the folded portions 27*c* of the antenna pattern 27*a*, 27*b*.

The first conductor pattern 45*a* of the RFID tag 91 is formed to be located on the outside of all the folded portions 27*c* on one side in the extending direction (e.g., in the X direction) of the meander-shaped first or second antenna pattern 27*a* or 27*b* extending from the land pattern 33. The RFID tag 91 including a conductor pattern of such a size generates a magnetic field as a magnetic field antenna for the electromagnetic wave of the second frequency and therefore deteriorates the radiation characteristics of the antenna pattern 27 at the second frequency.

Third Exemplary Embodiment

Figure 19:
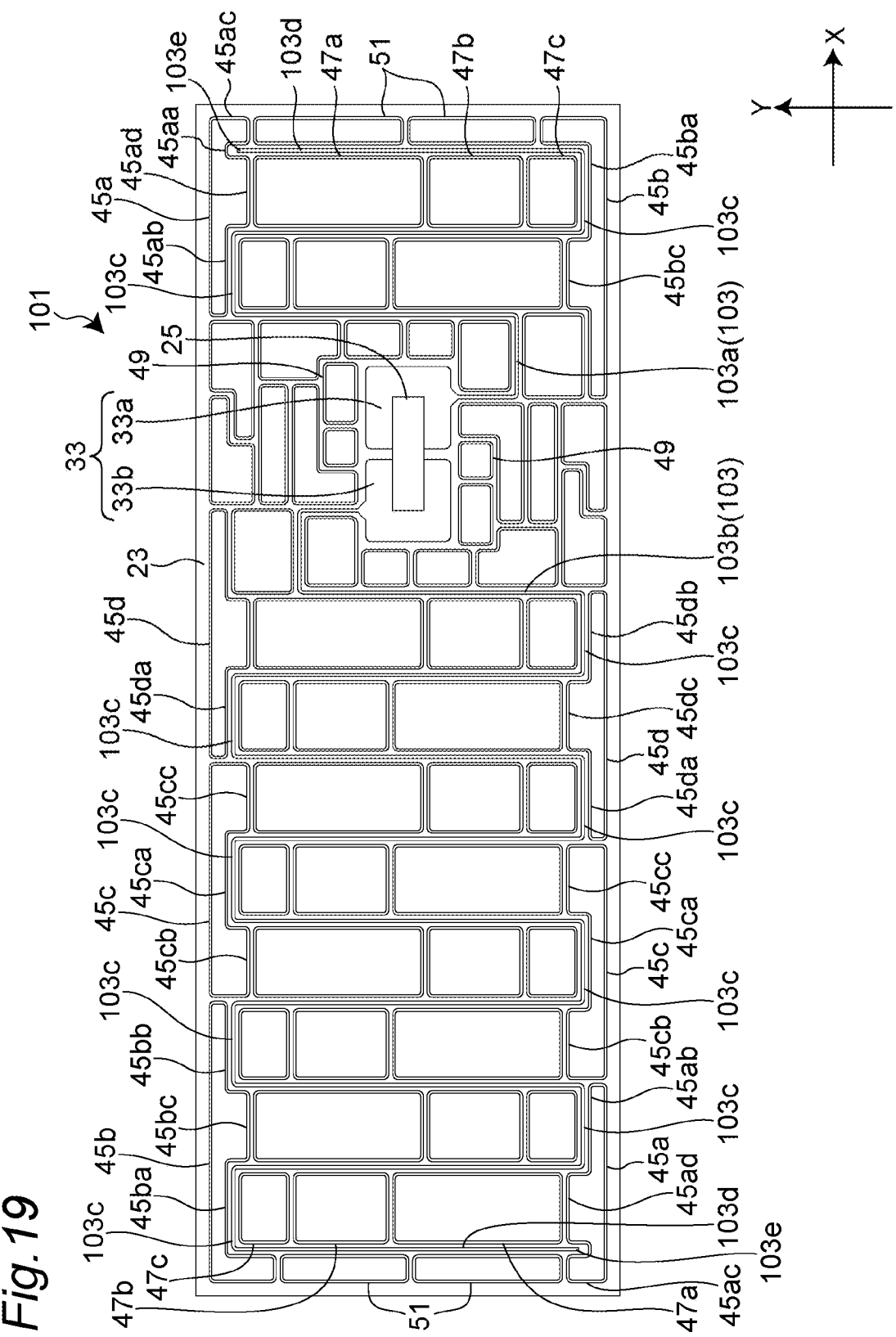
FIG. 19 is a plan view showing a wireless communication device (RFID tag) of a third exemplary embodiment.

Description will hereinafter be made of an RFID tag 101 that is a wireless communication device of a third exemplary embodiment with reference to FIG. 19. FIG. 19 is a plan view showing a configuration of the RFID tag 101 of the third embodiment.

Regarding the RFID tag 101 of the third embodiment, differences from the RFID tag 21 of the second embodiment will mainly be described. In the description of the third embodiment, elements having the same configurations, actions, and functions as those of the second embodiment described above are denoted by the same reference numerals and may not be described so as to avoid redundant description.

In the RFID tag 21 of the second embodiment, the antenna pattern 27 is a symmetrical dipole antenna since the first antenna pattern 27*a* and the second antenna pattern 27*b* have the same length. On the other hand, an antenna pattern 103 of the RFID tag 101 of the third embodiment is an asymmetric dipole antenna. Therefore, a first antenna pattern 103*a* and a second antenna pattern 103*b* constituting the antenna pattern 103 have respective different lengths. The length of the first antenna pattern 103*a* is shorter than the length of the second antenna pattern 103*b*.

In the RFID tag 101, the first conductor pattern 45*a* has the recess 45*aa* surrounding a leading end part 103*e* of the first or second antenna pattern 103*a*, 103*b* and a recess 45*ab* extending along a portion of a folded portion 103*c* of the first or second antenna pattern 103*a*, 103*b*. Additionally, the first conductor pattern 45*a* of the RFID tag 101 has the protruding part 45*ac* extending in a protruding shape along the outside of a outermost straight-line portion 103*d* of the first or second antenna pattern 103*a*, 103*b* in the longitudinal direction (e.g., in the X direction), and the protruding part 45*ad* extending in a protruding shape from a lateral side between two adjacent folded portions 103*c* in the first or second antenna pattern 103*a*, 103*b*.

In the RFID tag 101, the third conductor pattern 45*c* has a protruding part 45*cc* extending in a protruding shape from a lateral side between two adjacent folded portions 103*c* in the second antenna pattern 103*b*, in addition to the protruding part 45*cb*.

In the RFID tag 101, the fourth conductor pattern 45*d* has a recess 45*db* extending along a portion of the folded portion 103*c* of the second antenna pattern 103*b*, in addition to the recess 45*da*. The recess 45*db* of the fourth conductor pattern 45*d* and a straight-line portion of a shield pattern are arranged to surround the outside of the folded portion 103*c*. The fourth conductor pattern 45*d* has a protruding part 45*dc* extending in a protruding shape from a lateral side between the two adjacent folded portions 103*c* in the second antenna pattern 103*b*.

In the RFID tag 101, the antenna pattern 103 extends in a meander shape, and at least portions of the conductor patterns 45*a* to 45*d* are arranged on the outer side in the meander amplitude direction relative to the folded portions 103*c* of the meander-shaped antenna pattern 103. Therefore, the conductor patterns 45*a* to 45*d* can reduce the electromagnetic waves of the second frequency received in the meander amplitude direction by the antenna pattern 103.

Figure 20:
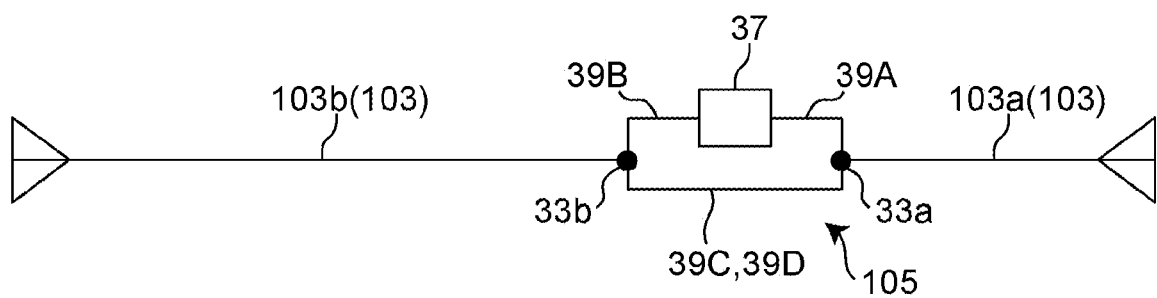
FIG. 20 is an explanatory diagram for explaining a configuration of the wireless communication device of the third exemplary embodiment.

FIG. 20 is an explanatory diagram for explaining a circuit of the antenna pattern 103 of the RFID tag 101. In the RFID tag 101 having the asymmetrical dipole antenna, the radiation characteristics of the antenna pattern 103 can be optimized by matching an impedance Z1 on the side of the antenna pattern 103 and an impedance Z2 on the side of a loop pattern 105. The loop pattern 105 is made up of the inductance elements 39A, 39B, 39C, 39D.

The impedance Z1 is the impedance between the first land pattern 33a connected to the first antenna pattern 103a and the second land pattern 33b connected to the second antenna pattern 103b in the absence of the loop pattern 105.

The impedance Z2 is the impedance between the first land pattern 33a and the second land pattern 33b both connected to the loop pattern 105 in the absence of the antenna pattern 103.

The impedance Z1 increases when the first antenna pattern 103a and the second antenna pattern 103b are made asymmetrical. Therefore, for example, the impedance Z2 can be increased by increasing the length of the loop pattern 105 not passing through the RFIC chip 37 between the first land pattern 33a and the second land pattern 33b, or more specifically, by increasing the length of the inductance elements 39C and 39D. In this way, the impedance Z2 can be matched to the increased impedance Z1.

The radiation characteristics of the antenna pattern 103 can be optimized in the matching condition of the impedances Z1 and Z2 that a voltage standing wave ratio ("VSWR") is three or less or a return loss is 6 dB or more.

Since the first antenna pattern 103a and the second antenna pattern 103b are asymmetrical, the second antenna pattern 103b having the long antenna pattern can be attached to a metal surface of an article to use the metal surface as a radiation element. Therefore, the RFID tag 101 can be used for both non-metallic and metallic articles.

Figure 21:
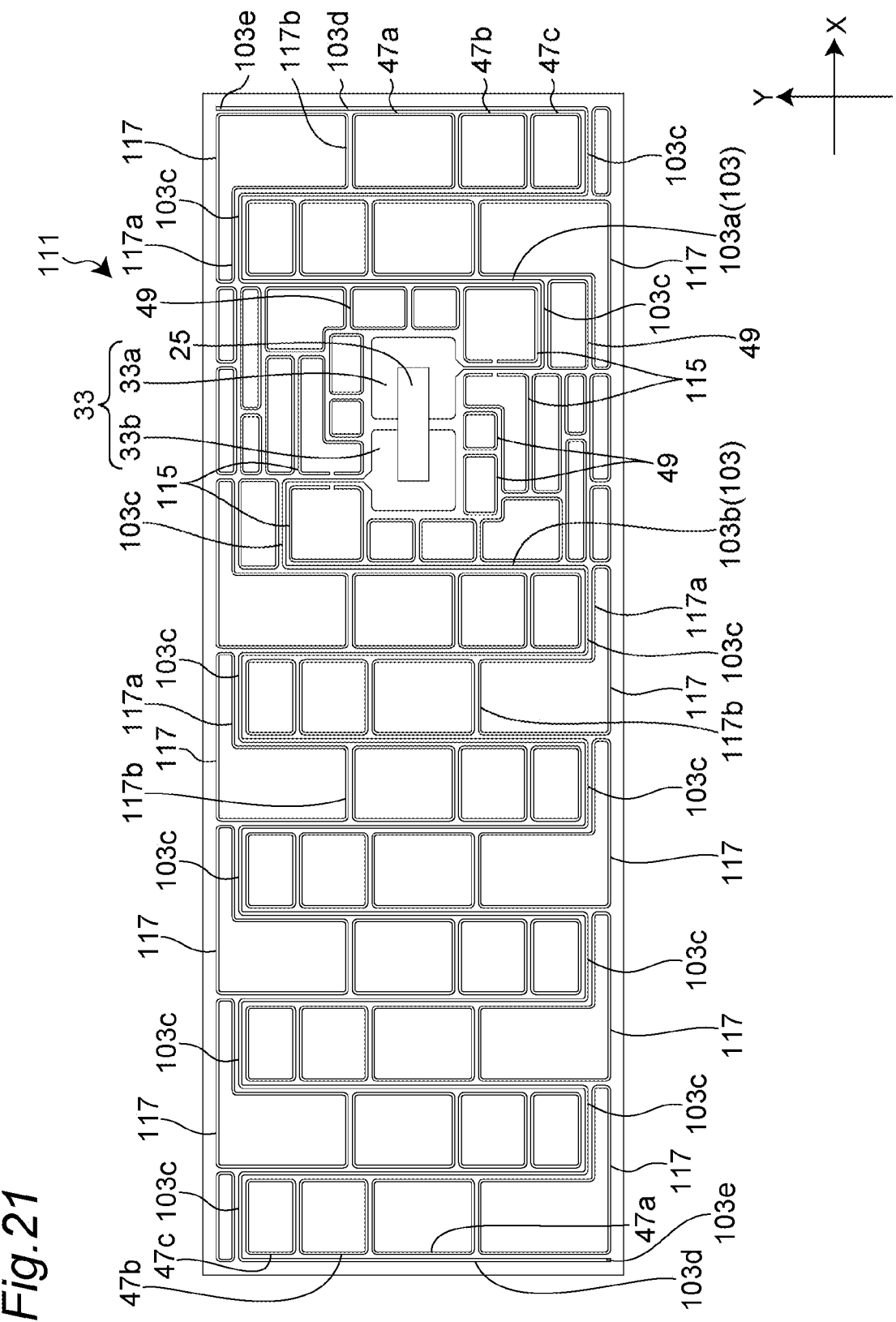
FIG. 21 is a plan view showing a wireless communication device (RFID tag) of a first modification of the third exemplary embodiment.

Description will hereinafter be made of an RFID tag 111 that is a wireless communication device of a first modification of the third embodiment according to the present invention with reference to FIG. 21. FIG. 21 is a plan view showing a configuration of the RFID tag 111 of the third embodiment.

Regarding the RFID tag 111 of the first modification of the third embodiment, differences from the RFID tag 101 of the third embodiment will mainly be described. In the description of the third embodiment, elements having the same configurations, actions, and functions as those of the third embodiment described above are denoted by the same reference numerals and may not be described so as to avoid redundant description.

In the RFID tag 111 of the first modification of the third embodiment, the second shield pattern 51 is omitted from the RFID tag 101 of the third embodiment. Ninth conductor patterns 117 included in the RFID tag 111 each have one L-shaped part 117a and one protruding part 117b. The L-shaped parts 117a are arranged outside the folded portions 103c to face the folded portions 103c of the antenna pattern 103. The protruding parts 117b are arranged between the certain folded portions 103c and the adjacent folded portions 103c of the antenna pattern 103 and between the folded portion 103c and the leading end part 103e.

The first shield patterns 49 and third shield patterns 115 having a partially discontinuous loop shape are arranged around the land pattern 33. The third shield patterns 115 are made of a conductive material, as with the first shield patterns 49.

A current also flows through the third shield patterns 115 in a direction of canceling the magnetic field generated by the current flowing between the first antenna pattern 113a and the land patterns 33a, 33b. However, since the third shield patterns 115 are partially discontinuous, when an electromagnetic wave in the band of the first frequency higher than the communication frequency is applied, discharge occurs at this discontinuous portion. This causes an antenna foil of the antenna base material 23 to locally sublime at the discharge position. Since the antenna pattern of the second antenna pattern 113b is located in the vicinity of the position of sublimation, this causes the antenna base material 23 to sublime and has a function of breaking the antenna pattern of the second antenna pattern 113b in the vicinity thereof at the same time.

Even with the configuration of the first modification of the third embodiment, when the RFID tag 111 receives electromagnetic wave having the second frequency higher than the communication frequency, an eddy current is generated in the inter-line patterns 47a, 47b, 47c, and a magnetic field is generated, so that a portion of the supplied electric power is lost as magnetic field energy.

Figure 22:
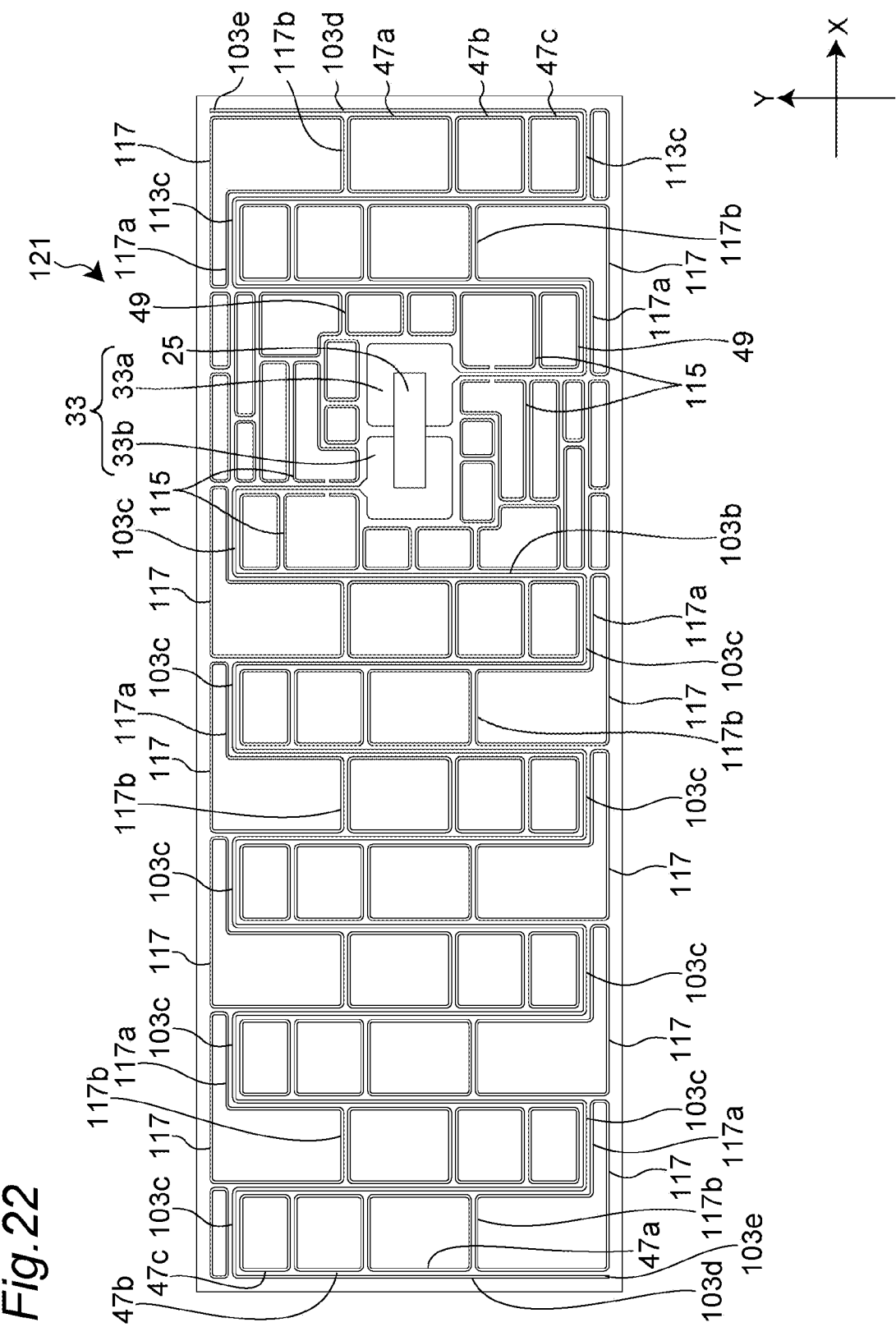
FIG. 22 is a plan view showing a wireless communication device (RFID tag) of a second modification of the third exemplary embodiment.

Description will hereinafter be made of an RFID tag 121 that is a wireless communication device of a second modification of the third embodiment according to the present invention with reference to FIG. 22. FIG. 22 is a plan view showing a configuration of the RFID tag 121 of the second modification of the third embodiment.

With regard to the RFID tag 121 of the second modification of the third embodiment, differences from the RFID tag 111 of the first modification of the third embodiment will mainly be described. In the description of the second modification of the third embodiment, elements having the same configurations, actions, and functions as those of the first modification of the third embodiment described above are denoted by the same reference numerals and may not be described so as to avoid redundant description.

The first and second antenna patterns 103a, 103b of the RFID tag 111 of the first modification of the third embodiment respectively extend from the land patterns 33a and 33b around the third shield patterns 115. On the other hand, the first and second antenna patterns 103a, 103b of the RFID tag 121 of the second modification of the third embodiment respectively extend from the land patterns 33a and 33b along the partially discontinuous sides of the third shield patterns 115a and further extend around the first shield patterns arranged outside of the third shield patterns 115 in the width direction. As a result, the first and second antenna patterns 103a, 103b of the RFID tag 121 can be formed longer than the RFID tag 111. The other elements are substantially the same as the RFID tag 111 of the first modification of the third embodiment.

Fourth Exemplary Embodiment

Figure 23:
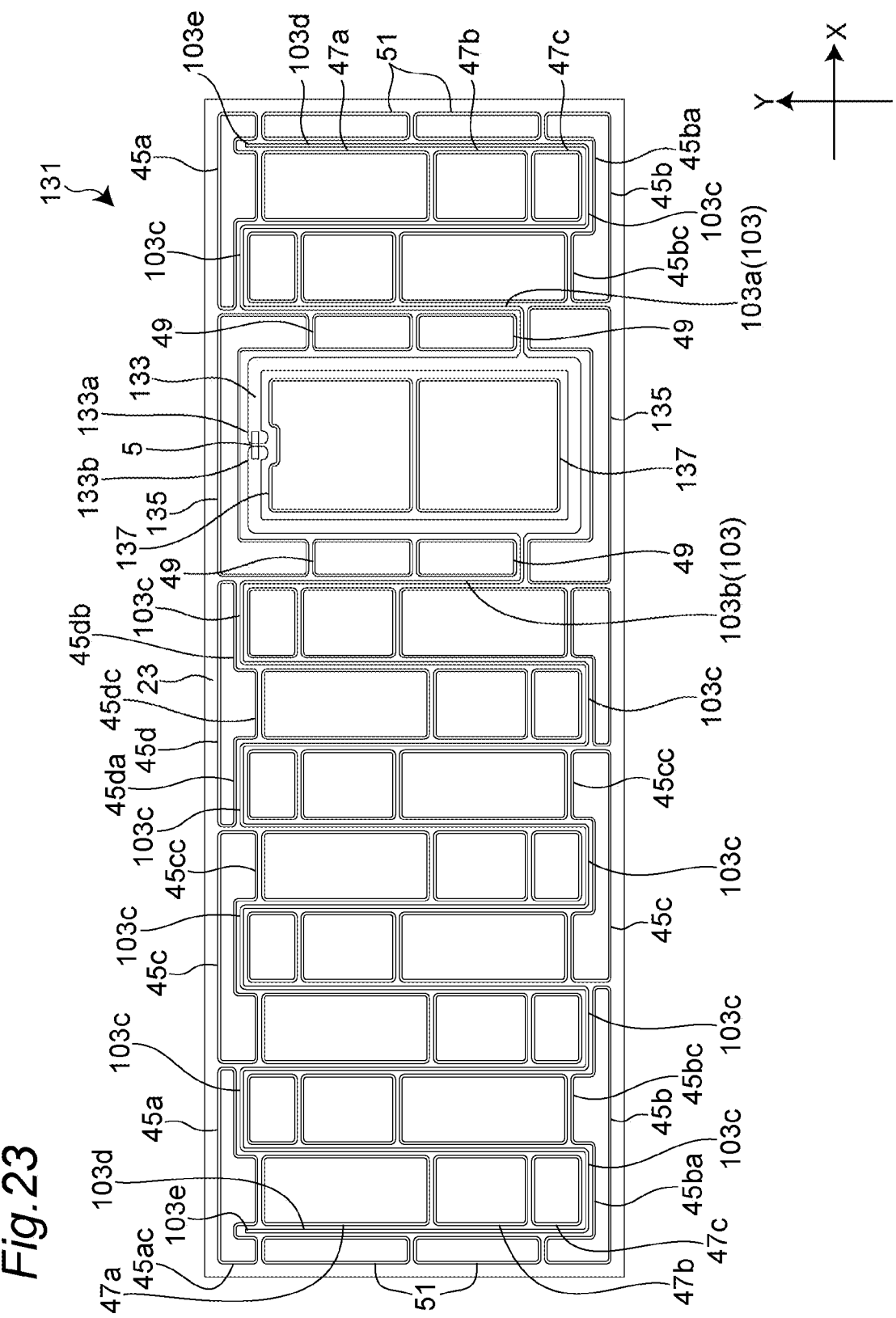
FIG. 23 is a plan view showing a wireless communication device (RFID tag) of a fourth exemplary embodiment.

Description will hereinafter be made of an RFID tag 131 that is a wireless communication device of a fourth exemplary embodiment with reference to FIG. 23. FIG. 23 is a plan view showing a configuration of the RFID tag 131 of the fourth embodiment.

In the RFID tag 131 of the fourth embodiment, the antenna pattern 9 of the RFID tag 1 of the first embodiment constitutes a meander-shaped asymmetric dipole antenna and has a form of a combination of the first embodiment and the third embodiment. Regarding the RFID tag 131 of the fourth embodiment, differences from the RFID tag 101 of the third embodiment will mainly be described. In the description of the fourth embodiment, elements having the same configurations, actions, and functions as those of the third embodiment described above are denoted by the same reference numerals and may not be described so as to avoid redundant description.

The RFID tag 131 of the fourth embodiment has a loop pattern 133 connected to the base sides of the first antenna pattern 103a and the second antenna pattern 103b. The loop pattern 133 has lands 133a, 133b on which the RFIC chip 5 is mounted. Two loop-shaped shield patterns 137 are arranged inside the loop pattern 133 on the antenna base material 23.

Tenth conductor patterns 135 are arranged outside of the loop pattern 133 on both sides in the width direction of the antenna base material 23. The first shield patterns 49 are arranged outside of the loop patterns 133 on both sides in the longitudinal direction of the antenna base material 23.

The respective leading end parts 103e of the first and second antenna patterns 103a, 103b of the RFID tag 101 of the third embodiment are arranged on the sides opposite to each other in the width direction (e.g., in the Y direction) of the antenna base material 23. In contrast, the respective leading end parts 103e of the first and second antenna patterns 103a, 103b of the RFID tag 131 of the fourth embodiment are arranged on one of the sides in the width direction of the antenna base material 23.

In the RFID tag 131 of the fourth embodiment, the antenna pattern 103 extends in a meander shape, and at least portions of the conductor patterns 45a to 45d are arranged on the outer side in the meander amplitude direction relative to the folded portions 103c of the meandering antenna pattern 103. Therefore, the conductor patterns 45a to 45d can reduce the electromagnetic waves of the second frequency received in the meander amplitude direction by the antenna pattern 103.

Figure 24:
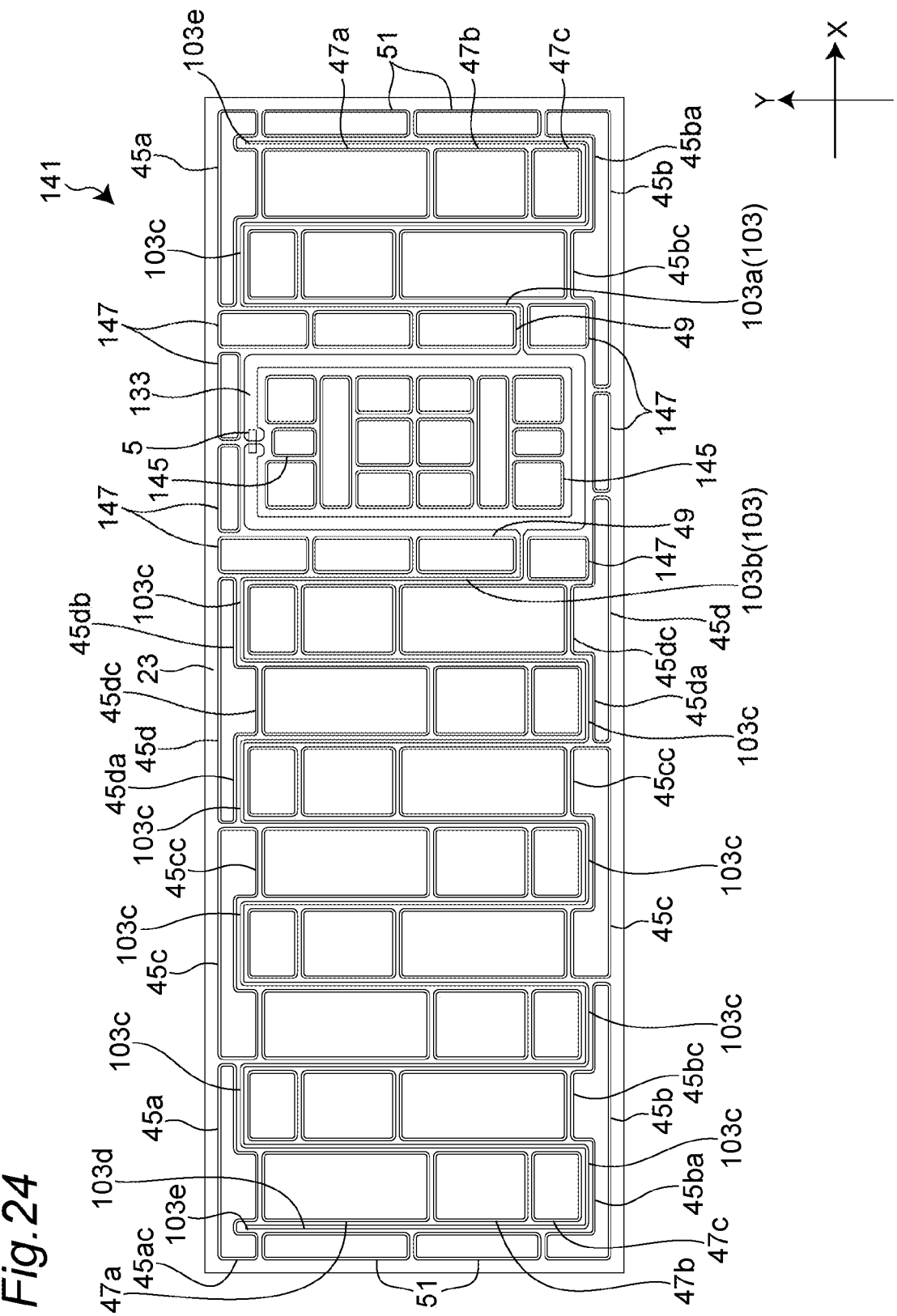
FIG. 24 is a plan view showing a wireless communication device (RFID tag) of a first modification of the fourth exemplary embodiment.

Description will hereinafter be made of an RFID tag 141 that is a wireless communication device of a first modification of the fourth embodiment according to the present invention with reference to FIG. 24. FIG. 24 is a plan view showing a configuration of the RFID tag 141 of the first modification of the fourth embodiment.

Regarding the RFID tag 141 of the first modification of the fourth embodiment, differences from the RFID tag 131 of the first modification of the fourth embodiment will mainly be described. In the description of the fourth embodiment, elements having the same configurations, actions, and functions as those of the fourth embodiment described above are denoted by the same reference numerals and may not be described so as to avoid redundant description.

In the RFID tag 131 of the fourth embodiment, the two shield patterns 137 are arranged inside the loop pattern 133 along an inner edge shape of the loop pattern 133. In contrast, in the RFID tag 141 of the first modification of the fourth embodiment, shield patterns 145 having a perimeter shorter than the shield patterns 137 are arranged inside the loop pattern 133.

Additionally, eleventh conductor patterns 147 are arranged outside of the loop patterns 133 of the RFID tag 141 on respective sides. The eleventh conductor patterns 147 each have a size obtained by dividing the tenth conductor pattern 135 of the RFID tag 131 of the fourth embodiment into three or four parts.

Even with the configuration of the RFID tag 141 of the first modification of the fourth embodiment, the same effect as the RFID tag 131 of the fourth embodiment can be obtained.

Fifth Exemplary Embodiment

Figure 25:
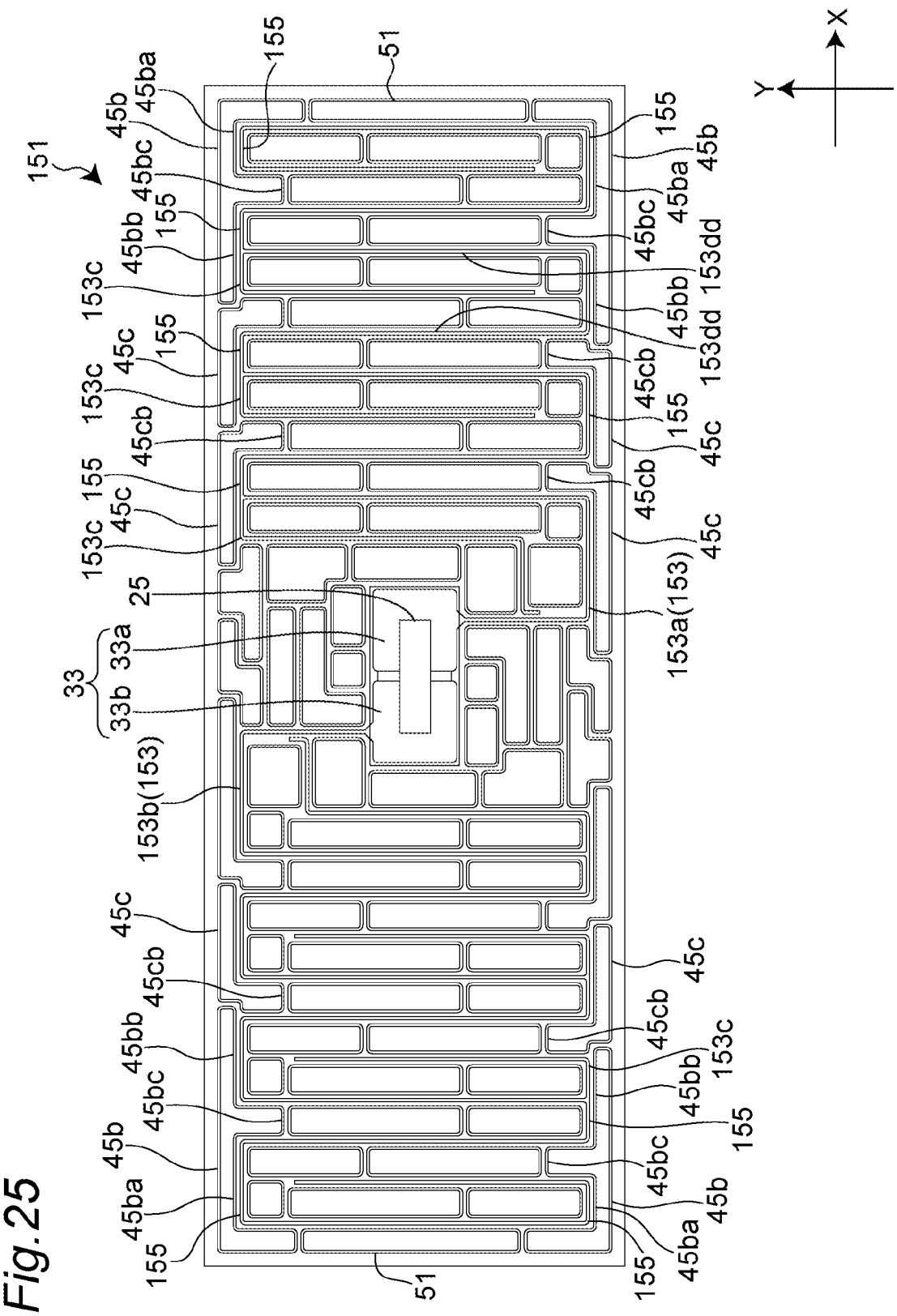
FIG. 25 is a plan view showing a wireless communication device (RFID tag) of a fifth exemplary embodiment.

Description will hereinafter be made of an RFID tag 151 that is a wireless communication device of a fifth embodiment according to the present invention with reference to FIG. 25. FIG. 25 is a plan view showing a configuration of the RFID tag 151 of the fifth embodiment.

Regarding the RFID tag 151 of the fifth embodiment, differences from the RFID tag 141 of the second embodiment will mainly be described. In the description of the fifth embodiment, elements having the same configurations, actions, and functions as those of the second embodiment described above are denoted by the same reference numerals and may not be described so as to avoid redundant description.

The antenna pattern 153 of the RFID tag 151 of the fifth embodiment has branch line patterns 153c each branching from first and second antenna patterns 153a, 153b formed into a meander shape. The branch line pattern 153c branch from each of bending portions 155 of the first and second antenna patterns 153a, 153b toward the land pattern 33 in the longitudinal direction (e.g., in the X direction). After branching, the branch line pattern 153c further extends toward the bending portion 155 on the other side of the branching bending portion 155 in the width direction (e.g., in the Y direction) and is sandwiched between the straight-line portions 153d of each of the first and second antenna patterns 153a, 153b. An LC parallel resonance circuit is formed together with the conductor pattern by using the inductance components of the branch line patterns 153c.

Figure 26:
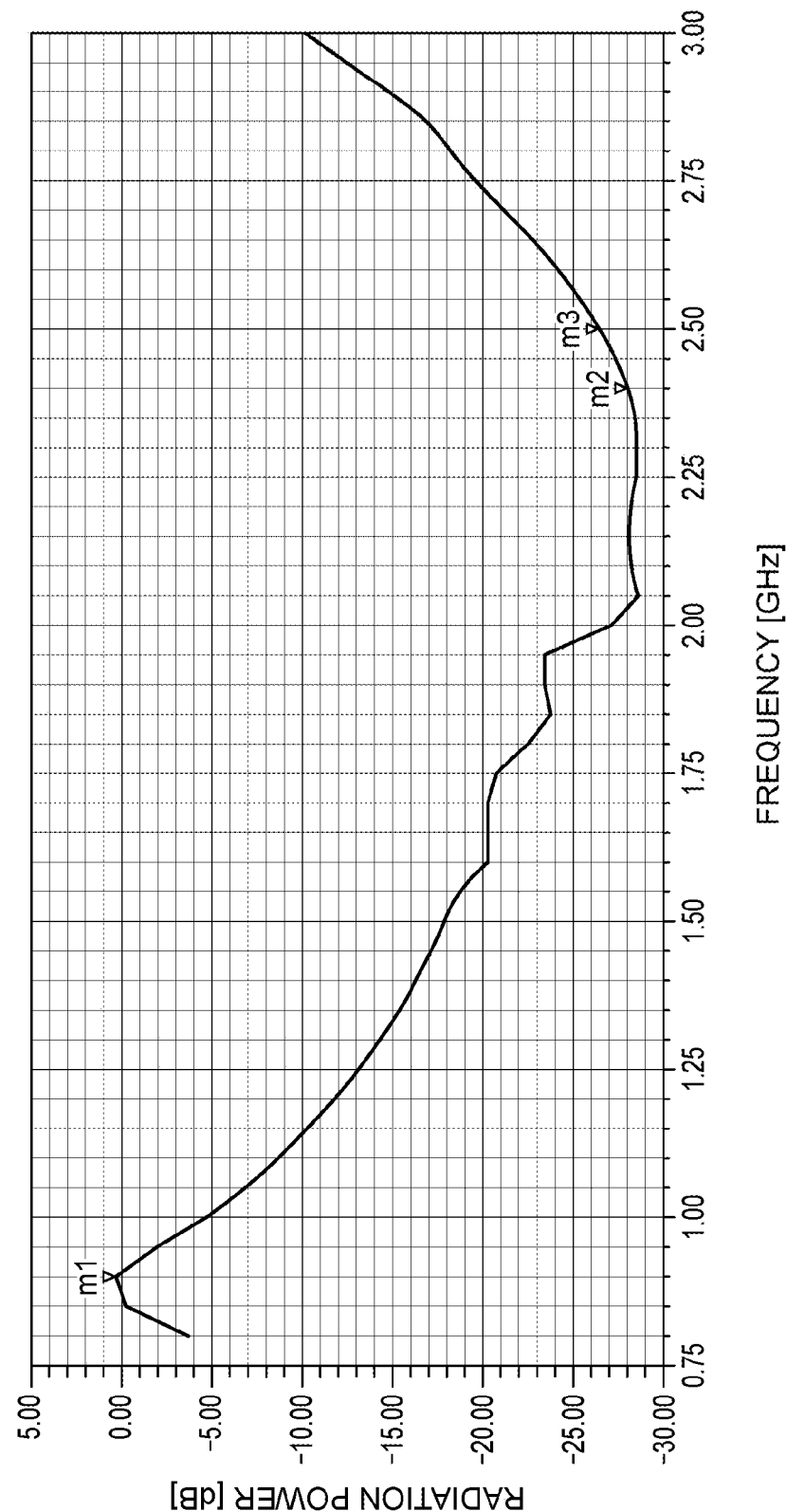
FIG. 26 is a frequency characteristic diagram showing a result of a simulation experiment in the wireless communication device of the fifth exemplary embodiment.

FIG. 26 is a frequency characteristic diagram showing a result of a simulation experiment performed on the RFID tag 151 of the fifth embodiment. In the frequency characteristic diagram of the antenna radiation efficiency shown in FIG. 26, the feeding level is +0.27 DB at the frequency of 0.90 GHz indicated by Vm1. In the frequency of the heating electromagnetic wave used in the microwave oven, the feeding level is −28 dB at the frequency of 2.4 GHz indicated by Vm2, and is −26 dB at the frequency of 2.5 GHz indicated by Vm3, and it can be understood that considerable attenuation is achieved. It can also be understood that attenuation is achieved not only in the frequency band of 2.4 to 2.5 GHz but also in the frequency band higher than the communication frequency. For example, the attenuation to −12 dB or more is achieved for a frequency of about 1.2 GHz or higher.

As described above, it can be understood that in the RFID tag 151 of the fifth embodiment, a high frequency signal (e.g., radio signal) having a UHF band communication frequency (900 MHz band, e.g., 900 MHz) can be transmitted and received and that the feeding level is considerably attenuated (about −26 dB) at the heating frequency (2.4 to 2.5 GHz) used in the electromagnetic heating device microwave oven. This indicates that the power of 1000 W of the electromagnetic wave heating device is attenuated to 2.5 W or less, which means that rapid overheating is unlikely to occur and that ignition hardly occurs.

As described above, in the RFID tag 151 of the fifth embodiment, the heating frequency (2.4 to 2.5 GHz) used in the microwave oven is significantly attenuated (about −26 dB); however, the feeding level is not completely zero. Therefore, when the RFID tag 151 of the fifth embodiment is dielectrically heated together with a commercial product by the microwave oven, a minute current flows through the antenna pattern 153 (153a, 153b). This minute current is transmitted from the antenna pattern 153 through capacitive coupling to the inter-line patterns 47, generates heat due to the magnetic loss of the inter-line patterns 47 forming magnetic field antennas, and gradually loses energy.

Figure 27:
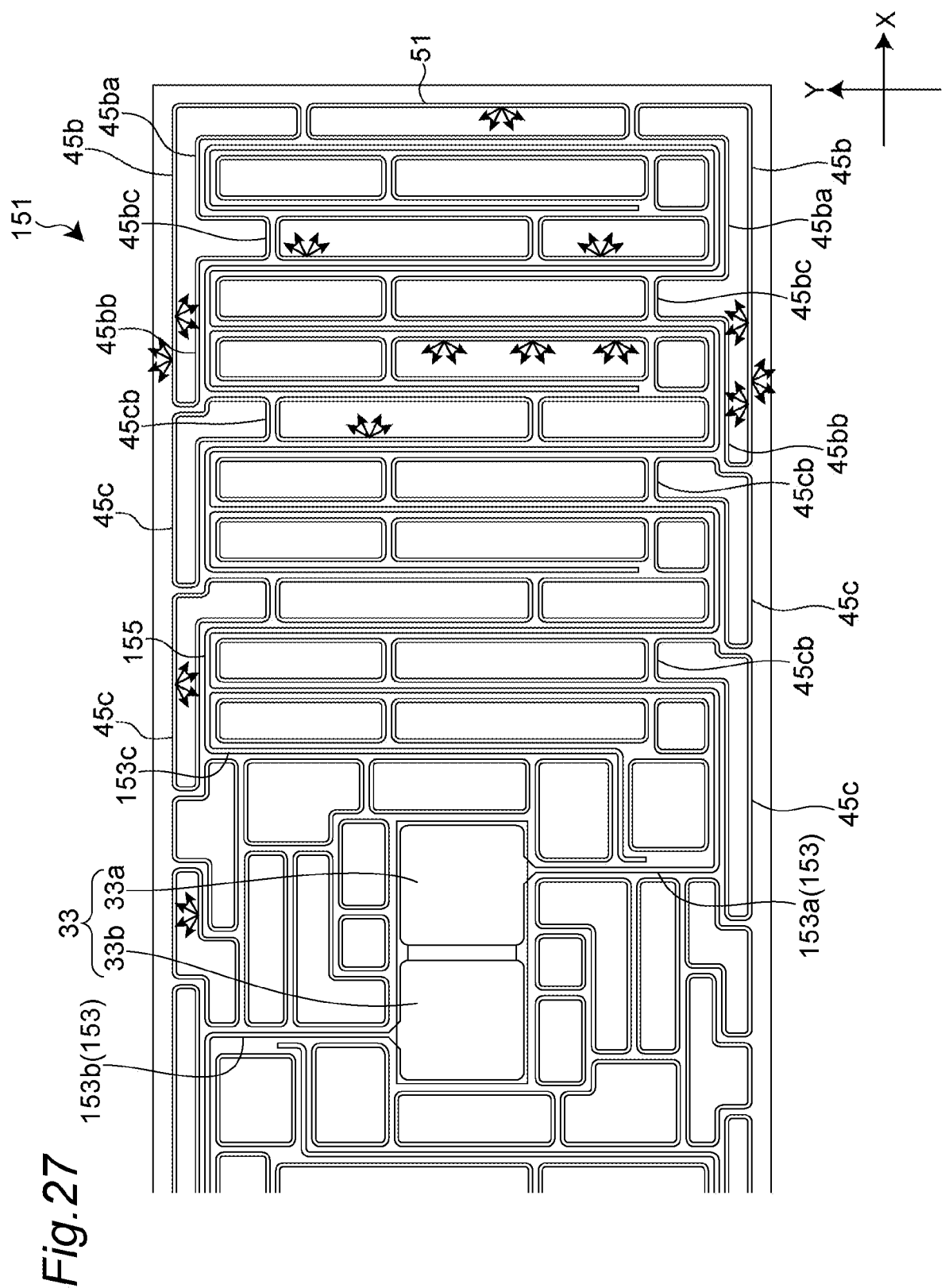
FIG. 27 is a view showing how the current flows when a signal of a heating frequency (2.4 GHz) used in an electromagnetic heating device is received in the wireless communication device of the fifth exemplary embodiment.
Figure 28:
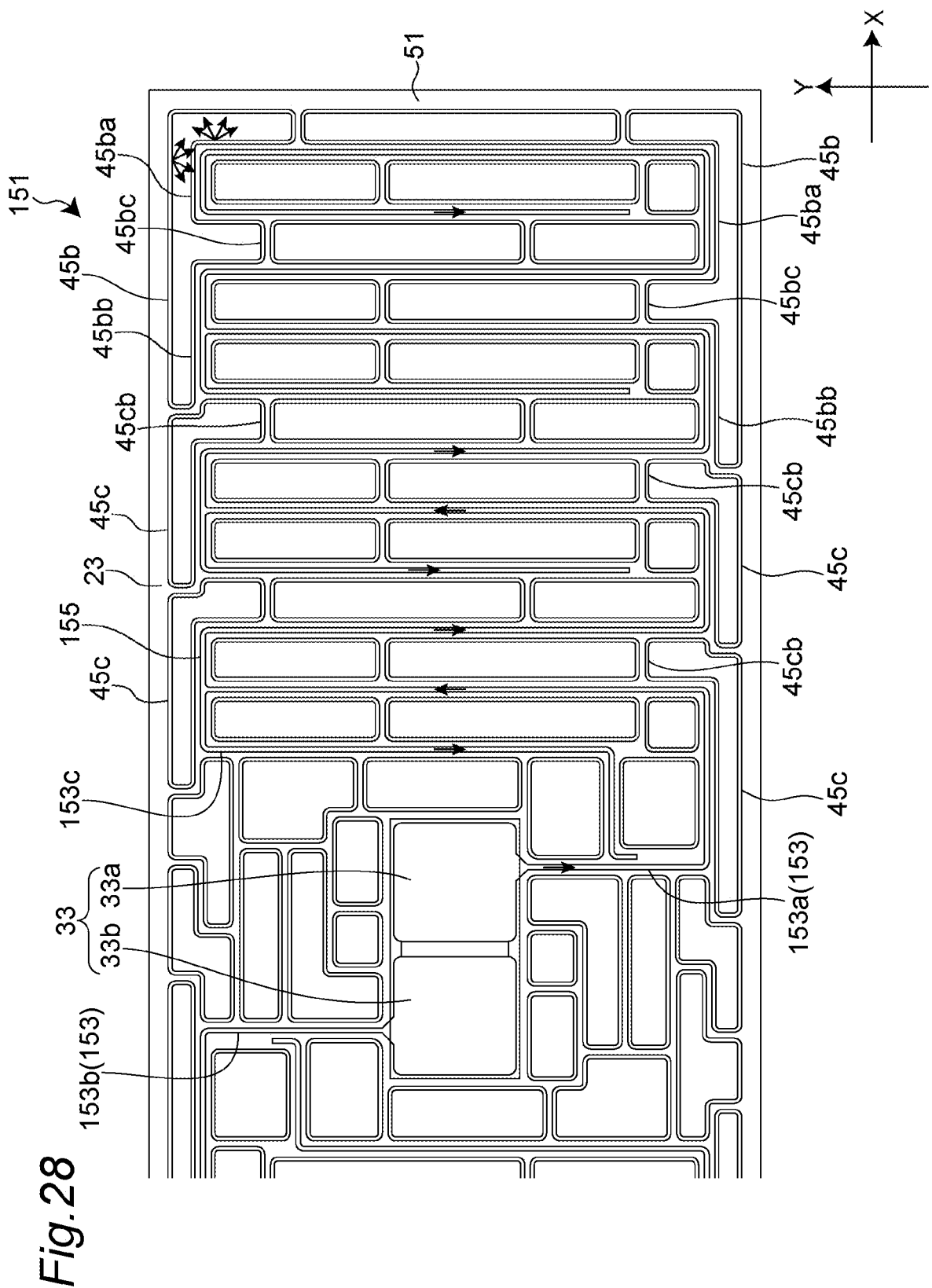
FIG. 28 is a view showing how the current flows when a signal of a UHF band communication frequency (920 MHz) is received in the wireless communication device of the fifth exemplary embodiment.

FIG. 27 is an explanatory view showing directions of currents flowing through the conductor patterns 45 and the second shield pattern 51 shown in FIG. 25 at the time of reception of electromagnetic wave having a high frequency (e.g., 2.4 GHz) higher than the communication frequency. FIG. 28 is an explanatory view showing the directions of currents flowing through the conductor patterns 45 shown in FIG. 25 at the time of reception of electromagnetic wave having the communication frequency (e.g., 920 MHz).

As shown in FIG. 27, when an electromagnetic wave in a frequency band higher than the communication frequency is applied to the antenna pattern 153, a magnetic field coupling between the antenna pattern 153 and the conductor pattern 45 causes an eddy current having a reversal point at which the direction of the current is reversed to flow in the conductor pattern 45. A magnetic field is generated from the conductor pattern 45 due to this eddy current. Since the magnetic field is generated, a portion of the electric power supplied to the antenna pattern 153 turns into magnetic field energy, generates heat due to a magnetic loss of the conductor pattern 45, and gradually loses energy. In this way, the energy in the frequency band higher than the communication frequency can be attenuated.

In each of the first to fourth conductor patterns 45*a* to 45*d*, the reversal point PA of making the direction of the induced current opposite moves on each of the first to fourth conductor patterns 45*a* to 45*d* over time. The movement of the reversal point PA affects an induced current of a standing wave generated in the antenna pattern 153.

As the reversal point moves, the amplitude of the standing wave generated in the antenna pattern 153*a* changes. Due to this change in the amplitude, the electric field emitted from the antenna pattern 153 is not constant and is therefore reduced.

Figure 29:
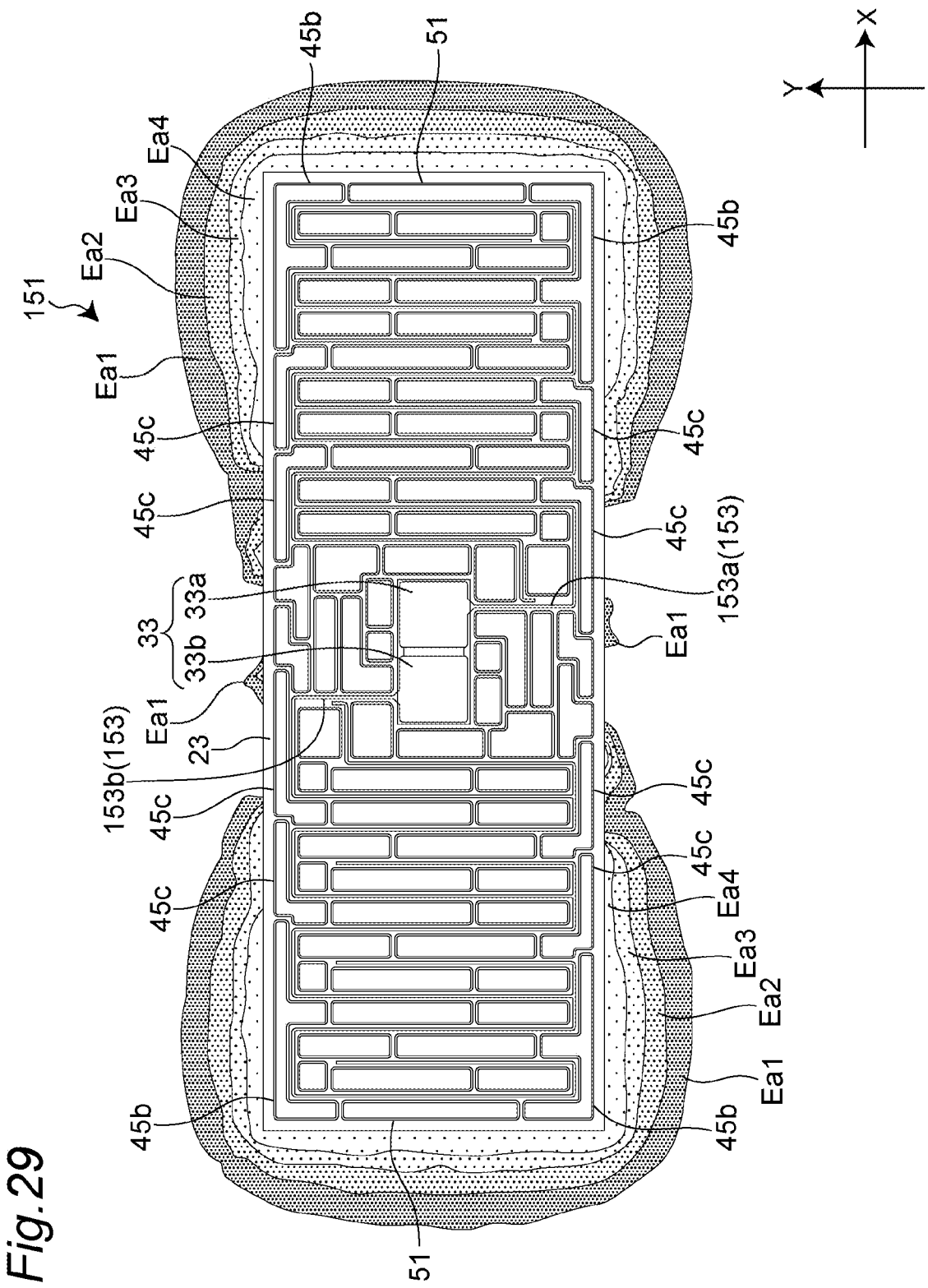
FIG. 29 is a view showing field emission when the signal of the UHF band communication frequency (920 MHz) is received in the wireless communication device of the fifth exemplary embodiment.
Figure 30:
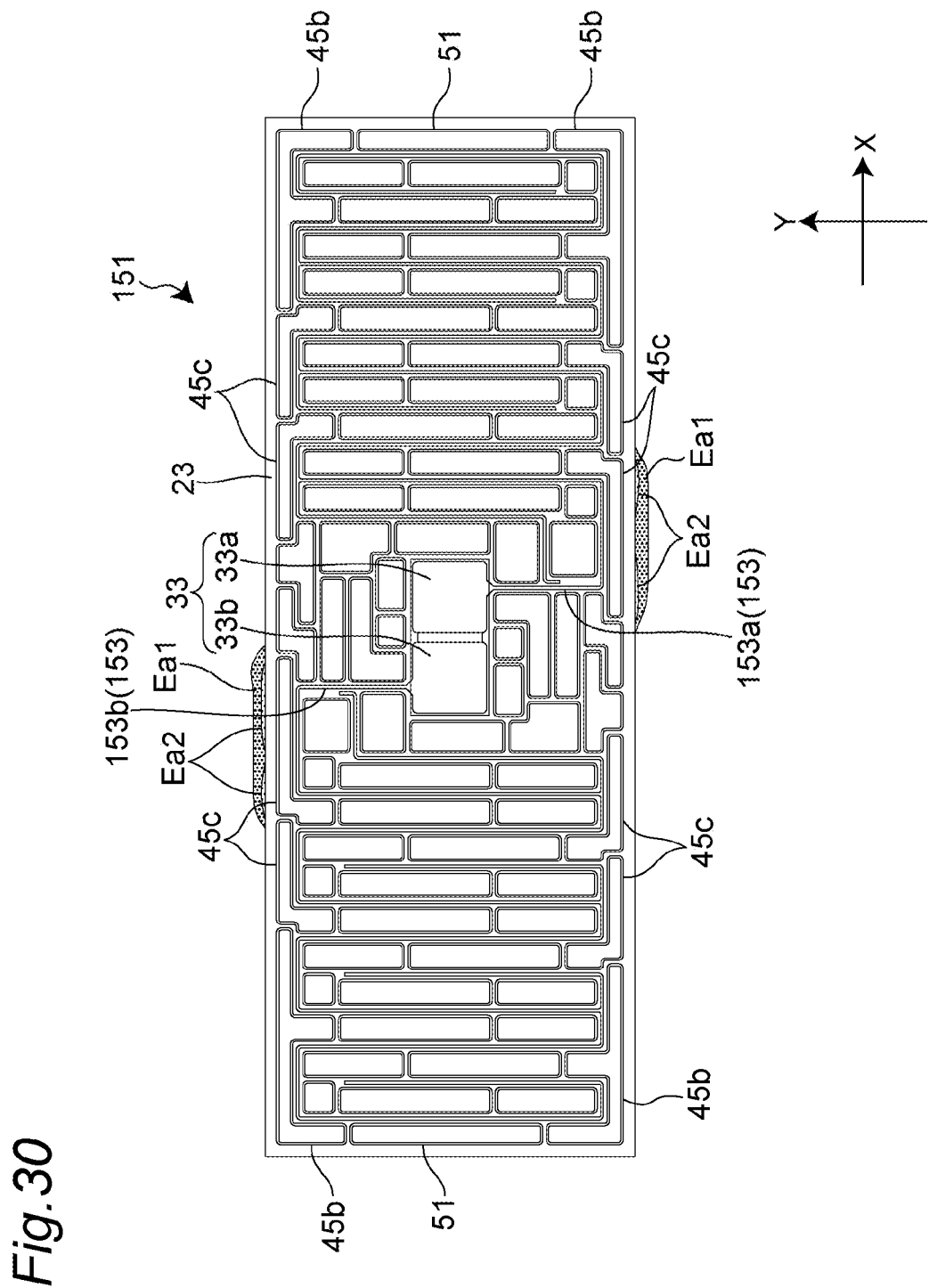
FIG. 30 is a view showing field emission when a signal of a heating frequency (2.4 GHz) used in an electromagnetic wave heating device is received in the wireless communication device of the fifth exemplary embodiment.

FIG. 29 is a view obtained from a simulation experiment for the intensity distribution of the electric field radiated from the antenna base material 23 when a signal of the UHF band communication frequency (e.g., 920 MHz) is received in the RFID tag 151 of the fifth embodiment. FIG. 30 is a view obtained from a simulation experiment for the intensity distribution of the electric field radiated from the antenna base material 23 when high frequency waves of the heating frequency (e.g., 2.4 GHz) used in the microwave oven are received.

As shown in FIG. 29, when an electric field in the UHF band is applied, an electric field is radiated from the antenna base material 23, and it is understood that the antenna pattern 27*a* functions as an antenna. The electric field regions Ea1, Ea2, Ea3, Ea4 are generated around the antenna base material 23, and the electric field intensity becomes weaker as a distance from the antenna base material 23 increases. Therefore, in the electric field regions Ea1 to Ea4, the electric field intensity in the electric field region Ea4 is the strongest, and the electric field intensity in the electric field region Ea1 is the weakest.

As shown in FIG. 30, when the electric field of 2.4 GHz is applied, the intensity of the electric field radiated from the antenna base material 23 is smaller than when the electric field of the UHF band is applied. The electric field regions Ea3, Ea4 are not generated around the antenna base material 23. Therefore, it is understood that the function of the antenna pattern 153 as an antenna is significantly reduced as compared to when the electric field of the UHF band is applied.

As described above, according to these embodiments, even when a commercial product having the wireless communication device attached thereto is mistakenly heated in an electromagnetic wave heating device with the wireless communication device still attached, the discharge in the wireless communication device prevented from occurring. This configuration enables provision of the highly safe and reliable wireless communication device capable of preventing the ignition of the wireless communication device and the risk of ignition of a commercial product having the wireless communication device attached thereto. Therefore, the exemplary embodiments of the present invention provide for a system automating the accounting and bagging of purchased commercial products in a store such as a convenience store handling a wide variety of commercial products such as foods and daily necessities.

It is noted that the present invention is not limited to the embodiments described above and can be implemented in a modified manner as follows.

Although the flexible film material is used as the material of the antenna base material 23 in the embodiments described above, the present invention is not limited thereto. For example, the antenna base material 23 may be a flame-retardant film material in one exemplary aspect. When a flame-retardant film is employed as the antenna base material 23, for example, a film acquired by adding a halogen-based flame-retardant material or applying a flame-retardant coating material to a resin material such as PET (polyethylene terephthalate) resin or PPS (polyphenylene sulfide) resin is used as the flame-retardant film material. For the material of the antenna base material 23, a highly functional resin material such as heat-resistant PEN (polyethylene naphthalate) resin can be used.

Although the first frequency band for communication is the UHF band in the embodiments described above, the present invention is not limited thereto. The wireless communication may be performed through a high frequency signal having a communication frequency (e.g., a carrier frequency) in the HF band. In this case, the entire length of the antenna pattern is designed to receive the high frequency signal in the HF band. The HF band is a frequency band of 13 MHz or more and 15 MHz or less.

Although the present invention has been described in some detail in terms of the embodiments, these contents of disclosure of the embodiments may obviously be changed in detail of configurations, and changes in combinations and orders of elements in the embodiments may be achieved without departing from the scope and the idea of the present invention.

EXPLANATIONS OF LETTERS OR NUMERALS

1 RFID tag
3 antenna base materials
5 RFIC chips
7 loop pattern
7*a* first contact point
7*b* second contact point
9 antenna pattern
9*a* first antenna pattern
9*b* second antenna pattern
11 conductor pattern
11*a* first conductor pattern
11*b* second conductor pattern
14, 17 article
21 RFID tag
23 antenna base material
25 RFIC package
27 antenna pattern
27*a* first antenna pattern
27*aa* extending part
27*b* second antenna pattern 27ba extending part
27c folded portion
27d straight-line portion
27e leading end part
29 base material
31 protective sheet
33 land pattern
33a first land pattern
33b second land pattern
35A, 35B, 35C insulating sheet
37 RFIC chip
37a, 37b input/output terminal
39A, 39B, 39C, 39D inductance element
39Aa, 39Ba, 39Ca, 39Da land
39Ab, 39Bb land
41 external connection terminal
41a first external connection terminal
41b second external connection terminal
43 through-hole
45 conductor pattern
45a first conductor pattern
45aa, 45ab, 45ag recess
45ac, 45ad, 45ae, 45af protruding part
45aea straight-line portion
45b second conductor pattern
45ba, 45bb recess
45bc, 45bd protruding part
45c third conductor pattern
45ca recess
45cc, 45cc protruding part
45d fourth conductor pattern
45da, 45db recess
45dc protruding part
45e fifth conductor pattern
45f sixth conductor pattern
45g seventh conductor pattern
45h eighth conductor pattern
47 line spacing pattern
47a, 47b, 47c inter-line pattern
49 first shield pattern
51 second shield pattern
61, 71, 81 RFID tag
83 antenna pattern
83b second antenna pattern
83c extending part
85 flat plate part
91, 101 RFID tag
103 antenna pattern
103a first antenna pattern
103b second antenna pattern
103c folded part
103d straight-line portion
103e leading end part
105 loop pattern
111 RFID tag
113 antenna pattern
113a first antenna pattern
113b second antenna pattern
115 third shield pattern
117 ninth conductor pattern
117a L-shaped part
117b protruding part
121, 131 RFID tag
133 loop pattern
133a, 133b land
135 tenth conductor pattern
137 shield pattern
141 RFID tag
145 shield pattern
147 eleventh conductor pattern
151 RFID tag
153 antenna pattern
153a first antenna pattern
153b second antenna pattern
153c branch line pattern
155 bending portion

What is claimed:

1. A wireless communication device for transmitting and receiving a high frequency signal having a first frequency for communication, comprising:
a base material having a main surface;
an antenna pattern disposed on the main surface of the base material and extending in a longitudinal direction of the main surface of the base material;
an RFIC electrically connected to the antenna pattern; and
a loop-shaped conductor pattern disposed on the main surface of the base material and extending on both sides of the antenna pattern along the longitudinal direction of the antenna pattern,
wherein the conductor pattern comprises a perimeter that is shorter than a total length of the antenna pattern, and
wherein the conductor pattern is disposed apart from the RFIC and the antenna pattern.

2. The wireless communication device according to claim 1, wherein the conductor pattern comprises an electrical perimeter that is shorter than one wavelength of the high frequency signal of the first frequency.

3. The wireless communication device according to claim 2, wherein the electrical perimeter of the conductor pattern is shorter than a half wavelength of the high frequency signal of the first frequency.

4. The wireless communication device according to claim 1, wherein the conductor pattern comprises an electrical perimeter that is not an integral multiple of a wavelength of a high frequency wave of a second frequency higher than the first frequency.

5. The wireless communication device according to claim 4, wherein the electrical perimeter of the conductor pattern is longer than a half wavelength of the high frequency wave of the second frequency.

6. The wireless communication device according to claim 4, wherein the second frequency is a frequency configured for electromagnetic wave heating.

7. The wireless communication device according to claim 1, wherein the antenna pattern extends in a meander shape.

8. The wireless communication device according to claim 1, wherein the first frequency is a frequency band in a UHF band.

9. The wireless communication device according to claim 1, wherein the first frequency is a frequency band in an HF band.

10. The wireless communication device according to claim 1, wherein the antenna pattern is configured as a dipole antenna by first and second antenna patterns that are disposed in a point-symmetrical positional relationship with respect to a center of the antenna base material.

11. The wireless communication device according to claim 10, wherein the conductor pattern comprises a plurality of loop-shaped first conductor patterns that are disposed on both sides of the first and second antenna patterns along the longitudinal direction and a pair loop-shaped second conductor patterns disposed to surround respective ends of the first and second antenna patterns.

12. The wireless communication device according to claim 11, wherein each of the first and second loop-shaped conductor patterns comprises a perimeter that is shorter than a total length of the antenna pattern.

13. The wireless communication device according to claim 11, wherein each of the first and second loop-shaped conductor patterns comprises a perimeter having a length that is shorter than a total physical length of the antenna pattern.

14. The wireless communication device according to claim 1, wherein a space is provided between the conductor pattern and each of the RFIC and the antenna pattern, such that the conductor pattern is not in direct contact with either of the RFIC and the antenna pattern.

15. A wireless communication device for transmitting and receiving a high frequency signal having a first frequency for communication, comprising:
- a base material having a main surface;
- an antenna pattern disposed on the main surface of the base material and extending in a longitudinal direction of the main surface of the base material;
- a loop-shaped conductor pattern disposed on the main surface of the base material and extending on both sides of the antenna pattern along the longitudinal direction of the antenna pattern,
- wherein the conductor pattern comprises a perimeter that is shorter than a total length of the antenna pattern, and
- wherein at least a portion of the conductor pattern is disposed on an outer side in a meander amplitude direction relative to folded portions of the meander-shaped antenna pattern.

16. The wireless communication device according to claim 15, wherein the conductor pattern is one of a plurality of conductor patterns having respective different perimeters disposed along the longitudinal direction of an outer edge of the base material.

17. The wireless communication device according to claim 16,
wherein the conductor pattern has a protruding portion that protrudes inward from the outer side in the meander amplitude direction, and
wherein the protruding portion of the conductor pattern is disposed between a pair of adjacent folded portions of the antenna pattern.

18. The wireless communication device according to claim 15, further comprising a loop-shaped shield pattern that is disposed along a width direction of the outer edge of the base material, with the width direction being orthogonal to the longitudinal direction.

19. A wireless communication device for transmitting and receiving a communication signal at a first frequency, the device comprising:
- a base material having a main surface;
- an RFIC disposed on the main surface of the base material;
- first and second antenna patterns disposed on the main surface of the base material and extending from the RFIC towards opposing sides of the main surface of the base material; and
- a plurality of loop-shaped conductor patterns disposed on the main surface of the base material and on both sides of each of the first and second antenna patterns,
- wherein the plurality of loop-shaped conductor patterns each has a perimeter length that is shorter than a total length of the first and second antenna patterns,
- wherein each of the first and second antenna patterns extend in a meander shape, and
- wherein at least one of the plurality of loop-shaped conductor patterns is disposed on an outer side in a meander amplitude direction relative to folded portions of the meander-shaped antenna patterns.

20. The wireless communication device according to claim 19, wherein at least a portion of the plurality of loop-shaped conductor patterns have different perimeter lengths disposed along an outer edge of the base material.

* * * * *